United States Patent
Murayama et al.

(10) Patent No.: US 7,955,656 B2
(45) Date of Patent: Jun. 7, 2011

(54) HYDROPHILIC MEMBER AND PROCESS FOR PRODUCING THE SAME

(75) Inventors: Yuichiro Murayama, Odawara (JP); Sumiaki Yamasaki, Minami-Ashigara (JP); Kazushi Furukawa, Odawara (JP)

(73) Assignee: Fujifilm Corporation, Tokyo (JP)

( * ) Notice: Subject to any disclaimer, the term of this patent is extended or adjusted under 35 U.S.C. 154(b) by 597 days.

(21) Appl. No.: 12/031,304

(22) Filed: Feb. 14, 2008

(65) Prior Publication Data

US 2008/0292800 A1    Nov. 27, 2008

(30) Foreign Application Priority Data

Feb. 16, 2007 (JP) ................ P2007-036606
Sep. 28, 2007 (JP) ................ P2007-256734

(51) Int. Cl.
*B05D 3/02* (2006.01)
(52) U.S. Cl. .......... 427/385.5; 427/387; 427/388.1; 427/389.7; 427/393.5; 427/393.6
(58) Field of Classification Search .......... None
See application file for complete search history.

(56) References Cited

U.S. PATENT DOCUMENTS

| 6,013,372 A | 1/2000 | Hayakawa et al. |
| 2003/0143407 A1* | 7/2003 | Yamasaki et al. ............ 428/447 |
| 2007/0122745 A1 | 5/2007 | Yamasaki et al. |

FOREIGN PATENT DOCUMENTS

| JP | 64-86101 A | 3/1989 |
| JP | 4-338901 A | 11/1992 |
| JP | 6-29332 A | 4/1994 |
| JP | 7-16940 A | 1/1995 |
| JP | 2002-361800 A | 12/2002 |
| WO | WO-96/29375 | 9/1996 |

OTHER PUBLICATIONS

Article of the Chemical Daily News, Jan. 30, 1995, 1 page.

\* cited by examiner

*Primary Examiner* — Erma Cameron
(74) *Attorney, Agent, or Firm* — Birch, Stewart, Kolasch & Birch, LLP

(57) ABSTRACT

A process for producing a hydrophilic member, includes: coating a surface of a base material with a hydrophilic composition containing at least (a) a catalyst, (b) a hydrophilic polymer and (c) a metal alkoxide; and drying the composition, wherein a temperature for the drying is from 10° C. to 60° C.

14 Claims, No Drawings

HYDROPHILIC MEMBER AND PROCESS FOR PRODUCING THE SAME

FIELD OF THE INVENTION

The present invention relates to a process for producing a hydrophilic member having a hydrophilic layer with excellent antifouling properties, anti-fogging properties and quick-drying properties of water, etc. and good durability provided on a surface of a substrate of every kind and to a hydrophilic member obtained by the subject production process.

BACKGROUND OF THE INVENTION

Various technologies for preventing the adhesion of an oil stain onto a surface of a member are proposed. In particular, in an optical member including antireflection films, optical filters, optical lenses, spectacle lenses and mirrors, when used by a person, a stain such as fingerprints, sebum, sweat and cosmetics adheres thereto, whereby not only its function is reduced, but the removal of the stain is complicated. Therefore, it is desired to apply an effective stain-preventing treatment.

Also, in recent years, with the spread of mobiles, a display has been frequently used outdoors. When a mobile is used under an environment where external light is made incident, this incident light is regularly reflected on the display surface, and a problem that the reflected light is mixed with displayed light, whereby a problem that a displayed image is hardly viewed or other problem is caused. For that reason, an anti-reflection optical member is frequently disposed on the display surface.

As such an antireflection optical member, for example, one obtained by stacking a high refractive index layer and a low refractive index layer each composed of a metal oxide on a surface of a transparent substrate; one obtained by forming a single layer of a low refractive index layer made of an inorganic or organic fluorinated compound, etc. on a surface of a transparent substrate; and one obtained by forming a coating layer containing a transparent fine particle on a surface of a transparent plastic film substrate, thereby making external light irregularly reflect on the uneven surface are known. Similar to the foregoing optical members, when used by a person, a stain such as fingerprints and sebum is easy to adhere onto the surface of such an antireflection optical member, or only a portion where the stain has adhered becomes high in reflection, thereby causing a problem that the stain is more conspicuous. In addition thereto, there was also encountered a problem that the removal of the stain is difficult because fine irregularities are usually present on the surface of the antireflection film.

Various technologies for forming on a surface of a solid member an antifouling function having performance to make a stain hardly adhere onto the surface or to make it easy to remove an adhered stain are proposed. In particular, as a combination of an antireflection member and an antifouling member, for example, an antifouling, anti-friction material having an antireflection film composed mainly of silicon dioxide and treated with an organosilicon substituent-containing compound (see, for example, JP-A-64-86101); and an antifouling, anti-friction CRT filter in which a surface of a substrate is coated with a silanol-terminated organic polysiloxane (see, for example, JP-A-4-338901) are proposed. Also, an antireflection film containing a silane compound including polyfluoroalkyl group-containing silane compounds (see, for example, JP-B-6-29332); and a combination of an optical thin film composed mainly of silicon dioxide and a copolymer of a perfluoroalkyl acrylate and an alkoxysilane group-containing monomer (see, for example, JP-A-7-16940) are proposed.

However, the antifouling layer which is formed by a conventional method is insufficient in antifouling properties, and in particular, it is hard to wipe off a stain such as fingerprints, sebum, sweat and cosmetics. Also, in the surface treatment with a material with low surface energy, such as fluorine or silicon materials, there is a cause for fears that the antifouling performance is reduced with a lapse of time. For that reason, the development of an antifouling member with excellent antifouling properties and durability is desired.

In a resin film which is used in many ways for a surface of an optical member, etc. or an inorganic material such as glasses and metals, it is general that its surface is hydrophobic or exhibits weak hydrophilicity. When a surface of a substrate using a resin film, an inorganic material or the like is hydrophilized, adhered droplets are uniformly spread on the surface of the substrate to form a homogeneous film. Therefore, the fogging of glass, a lens or a mirror can be effectively prevented, and such is useful for preventing devitrification to be caused due to hygroscopic moisture, securing visibility in the rain or the like. Furthermore, urban soot, a combustion product contained in exhaust gases from automobiles, etc. (for example, carbon black) or a hydrophobic pollutant such as fats and oils and sealant elution components hardly adheres thereto, and even when it adheres, it is simply dropped off by rainfall or water washing. Therefore, such a material is useful for various applications.

According to a surface treatment method for achieving hydrophilization which has hitherto been proposed, for example, etching treatment and plasma treatment, though the surface is highly hydrophilized, its effect is temporary, and the hydrophilized state cannot be maintained over a long period of time. Also a surface-hydrophilic coating film using a hydrophilic graft polymer as one of hydrophilic resins is also proposed (see, for example, Article of The Chemical Daily News, dated Jan. 30, 1995). However, though this coating film has hydrophilicity to some extent, it cannot be said that the compatibility with a substrate is sufficient, and high durability is demanded.

Also, a film using titanium oxide has hitherto been known as a film with excellent surface hydrophilicity. For example, a technology for forming a photocatalyst-containing layer on a surface of a substrate to highly hydrophilize the surface corresponding to optical pumping of the photocatalyst is disclosed. It is reported that when this technology is applied to various composite materials such as glasses, lenses, mirrors, exterior materials and wet area materials, excellent antifouling properties can be imparted to such a composite material (see, for example, WO 96/29375 (corresponding to U.S. Pat. No. 6,013,372)). However, in view of the matters that a hydrophilic film using titanium oxide does not have sufficient film strength and that a hydrophilizing effect is not revealed unless it is optically pumped, there is involved a problem that a use site is limited. Therefore, an antifouling member having durability and good anti-abrasion properties is demanded.

In order to achieve the foregoing problems, it is found that a hydrophilic surface which is provided with a crosslinking structure due to hydrolysis and polycondensation of a hydrophilic polymer and an alkoxide while paying attention to a characteristic of a sol-gel organic/inorganic hybrid film exhibits excellent anti-fogging properties and antifouling properties and having good anti-abrasion properties (see, for example, JP-A-2002-361800 (corresponding to US2007/0122745A1)). A hydrophilic surface layer has such a crosslinking structure is easily obtainable by combining a specified hydrophilic polymer having a reactive group in an end thereof and a crosslinking agent.

SUMMARY OF THE INVENTION

As a result of further advancing studies regarding a so-gel organic/inorganic hybrid film and developing the foregoing related-art technologies, an object of the invention is to provide a process for producing a hydrophilic member having a hydrophilic layer with excellent anti-fogging properties, anti-fouling properties and quick-drying properties of water, etc. and good durability provided on a surface of a base material of every kind and a hydrophilic member obtained by the subject production process.

The present inventors further developed studies regarding a sol-gel organic/inorganic hybrid film. As a result, it has been found that in production steps of coating a surface of a base material of every kind with a hydrophilic composition containing at least (a) a catalyst, (b) a hydrophilic polymer and (c) a metal alkoxide and heat drying to form a hydrophilic film on the base material, by carrying out the heating (drying) treatment at a temperature lower than that of the related art (specifically, from 10 to 60° C.), the foregoing problems can be achieved. By carrying out the treatment at a low temperature, abrupt drying and hydrolysis reaction can be inhibited, defects and faults such as the generation of a partial crack on the hydrophilic film can be hardly caused. Though this action is not sufficiently elucidated yet, it is thought that volume contraction is small and a crack is hardly generated due to stress relaxation.

There is a defect that in a portion where a crack is generated on the surface of the hydrophilic layer, an anti-fogging or antifouling effect is reduced. However, this defect can be improved by the invention.

In particular, in a member having a hydrophilic layer of a relatively thick film by spray coating or the like, when the treatment is carried out at a high temperature, the foregoing defect is easily generated. However, this defect can be improved by the production process of the invention.

Specifically, the invention is as follows.
(1) A process for producing a hydrophilic member including the steps of coating a surface of a base material with a hydrophilic composition containing at least (a) a catalyst, (b) a hydrophilic polymer and (c) a metal alkoxide and drying, wherein a drying temperature in the drying step is from 10° C. to 60° C.
(2) The process for producing a hydrophilic member as set forth in (1), wherein the metal alkoxide (c) is an alkoxide of an element selected among Si, Ti, Zr and Al.
(3) The process for producing a hydrophilic member as set forth in (1) or (2), wherein a weight ratio (a)/(c) of the catalyst (a) to the metal alkoxide (c) in the hydrophilic composition is from 50/50 to 20/80.
(4) The process for producing a hydrophilic member as set forth in any one of (1) to (3), wherein the base material is glass, a plastic, a metal or a tile.
(5) A hydrophilic member obtained by the process for producing a hydrophilic member as set forth in any one of (1) to (4).

According to the invention, a process for producing a hydrophilic member having a hydrophilic film with excellent antifouling properties, anti-fogging properties and anti-friction properties on a surface of a substrate of every kind and a hydrophilic member obtained by the subject production process.

DETAILED DESCRIPTION OF THE INVENTION

The invention is hereunder described in detail.

The surface-hydrophilic member of the invention is a member in which a hydrophilic film (also referred to as "hydrophilic layer") having a hydrophilic polymer chain and having a crosslinking structure formed by hydrolysis and polycondensation of a metal alkoxide provided on an adequate base material. The hydrophilic layer having such a crosslinking structure can be properly formed by using a metal alkoxide compound as described later in detail and a compound having a hydrophilic functional group capable of forming a hydrophilic graft chain and an adequate catalyst. Of metal alkoxides, an alkoxide of Si is preferable in view of reactivity and easiness of availability. Concretely, a compound which is useful as a silane coupling agent can be favorably used.

In the invention, the crosslinking structure formed by hydrolysis and polycondensation of a metal alkoxide as described previously is properly referred to as "sol-gel crosslinking structure". Such a hydrophilic layer in which one end of the polymer chain is not immobilized and the mobility of the polymer chain is large can be, for example, easily formed by preparing a hydrophilic coating solution composition containing (A) a high-molecular weight compound having a reactive group such as a silane coupling group in an end thereof and represented by the following formula (I), or a high-molecular weight compound having such a reactive group as a side chain of a trunk polymer and represented by the following formula (II), (B) a hydrolyzable metal alkoxide compound and a metal complex catalyst capable of causing the hydrolysis and polycondensation; and coating (applying) and drying the hydrophilic coating solution composition to form a surface-hydrophilic layer. The respective components to be contained in the hydrophilic coating solution composition for forming a hydrophilic layer as this preferred embodiment are hereunder described.

[Hydrophilic Polymer]

The hydrophilic polymer which is used in the invention is a polymer having a hydrophilic group and having a group capable of generating a linkage with a metal alkoxide compound due to a catalytic action or the like. Preferred examples of the hydrophilic group include functional groups such as a carboxyl group, an alkali metal salt of a carboxyl group, a sulfonic group, an alkali metal salt of a sulfonic group, a hydroxyl group, an amide group, a carbamoyl group, a sulfonamide group and a sulfamoyl group. These groups may be present at any position in the polymer. A polymer structure in which a plural number of such hydrophilic groups are bonded to the polymer principal chain directly or via a connecting group or are bonded in the polymer side chain or graft side chain is preferable. Examples of the group capable of generating a linkage with a metal alkoxide compound due to a catalytic action include reactive groups such as a carboxyl group, an alkali metal salt of a carboxyl group, an anhydrous carboxyl group, an amino group, a hydroxyl group, an epoxy group, a methylol group, a mercapto group, an isocyanate group, a block isocyanate group, an alkoxysilyl group, an alkoxy titanate group, an alkoxy aluminate group, an alkoxy zirconate group, an ethylenically unsaturated group, an ester group and a tetrazole group. Examples of the polymer structure having a hydrophilic group and a group capable of generating a linkage with a metal alkoxide compound due to a catalytic action or the like include cyclic polymer structures of a natural product (for example, cellulose, amylose and chitosan) in addition to polymers resulting from vinyl polymerization of an ethylenically unsaturated group (for example, an acrylate group, a methacrylate group, an itaconic group, a crotonic group, a succinic group, a styrene group, a vinyl group, an allyl group, a vinyl ether group and a vinyl ester group), polycondensed polymers (for example, polyesters, polyamides and polyamic acid) and addition polymerized polymers (for example, polyurethanes). Specific examples include structures represented by the following formulae (I) and (II).

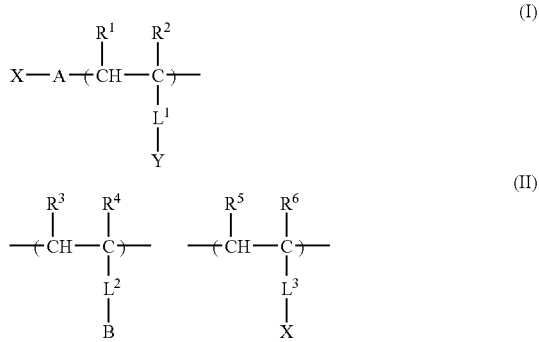

In the formulae (I) and (II), $R^1$, $R^2$, $R^3$, $R^4$, $R^5$ and $R^6$ each independently represents a hydrogen atom or a hydrocarbon group having from 1 to 8 carbon atoms; X represents a reactive group (for example, a carboxyl group or a salt thereof, an anhydrous carboxyl group, an amino group, a hydroxyl group, an epoxy group, a methylol group, a mercapto group, an isocyanate group, a block isocyanate group, an alkoxysilyl group, an alkoxy titanate group, an alkoxy aluminate group, an alkoxy zirconate group, an ethylenically unsaturated double bond, an ester linkage and a tetrazole group); A, $L^1$, $L^2$ and $L^3$ each independently represents a single bond or a connecting group; Y represents —NHCOR$^7$, —CONH$_2$, —CON(R$^7$)$_2$, —COR$^7$, —OH, —CO$_2$M, —SO$_3$M, —PO$_3$M, —OPO$_3$M or —N(R$^7$)$_3$Z$^1$; R$^7$ represents an alkyl group, an aryl group or an aralkyl group each having from 1 to 18 carbon atoms; M represents a hydrogen atom, an alkali metal, an alkaline earth metal or an onium; $Z^1$ represents a halogen ion; and B represents the following formula (III).

In the formula (III), $R^1$, $R^2$, $L^1$ and Y are the same as those in the formulae (I) and (II).

It is preferable that the hydrophilic polymer which is used in the invention has a reactive group and a hydrophilic group. There are the case where a reactive group is present in only one end of the principal chain; and the case where plural reactive groups are present in the principal chain.

The "reactive group" as referred to herein means a functional group capable of reacting with a hydrolysis and polycondensation product of the metal alkoxide to form a chemical bond. Also, reactive groups may form a chemical bond each other. The hydrophilic polymer is preferably water-soluble, and it is preferable that the hydrophilic polymer becomes water-insoluble upon reaction with a hydrolysis and polycondensation product of the metal alkoxide.

Similar to the usual meanings, the chemical bond includes a covalent bond, an ionic bond, a coordination bond and a hydrogen bond. The chemical bond is preferably a covalent bond.

In general, the reactive group is identical with a reactive group contained in a crosslinking agent of a polymer and is a compound capable of forming crosslinking by heat or light. The crosslinking agent is described in *Crosslinking Agent Handbook*, written by Shinzo YAMASHITA and Tosuke KANEKO and published by Taiseisha Ltd. (1981).

Examples of the reactive group include carboxyl (HOOC—) or a salt thereof (MOOC—, wherein M represents a cation), an anhydrous carboxyl group (for example, monovalent groups derived from succinic anhydride, phthalic anhydride or maleic anhydride), amino (H$_2$N—), hydroxyl (HO—), an epoxy group (for example, a glycidyl group), methylol (HO—CH$_2$—), mercapto (HS—), isocyanate (OCN—), a block isocyanate group, an alkoxysilyl group, an alkoxy titanate group, an alkoxy zirconate group, an ethylenically unsaturated double group, an ester group and a tetrazole group. The reactive group is most preferably an alkoxysilyl group. Two or more reactive groups may be present in one end thereof. The two or more reactive groups may be different from each other.

It is preferable that a connecting group is mediated between the repeating unit and the reactive group of the hydrophilic polymer or between the repeating unit and the principal chain of the hydrophilic polymer. It is preferable that the connecting groups A, $L^1$, $L^2$ and $L^3$ are each independently a single bond or selected among —O—, —S—, —CO—, —NH—, —N<, an aliphatic group, an aromatic group, a heterocyclic group and a combination thereof. The connecting group is preferably —O—, —S—, —CO—, —NH— or a combination containing —O—, —S—, —CO— or —NH—.

(Hydrophilic polymer (I) having a reactive group in one end thereof)

The hydrophilic polymer having a reactive group in one end thereof can be, for example, synthesized by radical polymerizing a hydrophilic monomer (for example, acrylamide, acrylic acid and a potassium salt of 3-sulfopropyl methacrylate) in the presence of a chain transfer agent (described in Kanji KAMACHI and Tsuyoshi ENDO, *Radical Polymerization Handbook*, NTS) or an iniferter (described in *Macromolecules,* 1986, 19, pages 287, et seq., Otsu). Examples of the chain transfer agent include 3-mercaptopropionic acid, 2-aminoethanethiol hydrochloride, 3-mercaptopropanol, 2-hydroxyethyl disulfide and 3-mercaptopropyl trimethoxysilane. Also, a hydrophilic monomer (for example, acrylamide) may be radical polymerized by using a radical polymerization initiator having a reactive group (for example, carboxyl) without using a chain transfer agent.

The hydrophilic chain having a reactive group in one end thereof preferably has a weight average molecular weight of not more than 1,000,000, more preferably from 1,000 to 1,000,000, and most preferably from 2,000 to 100,000.

The high-molecular weight compound represented by the formula (I) is a hydrophilic polymer having a reactive group in an end thereof. In the foregoing formula (I), $R^1$ and $R^2$ each independently represents a hydrogen atom or a hydrocarbon group having not more than 8 carbon atoms. Examples of the hydrocarbon group include an alkyl group and an aryl group; and a linear, branched or cyclic alkyl group having not more than 8 carbon atoms is preferable. Specific examples thereof include a methyl group, an ethyl group, a propyl group, a butyl group, a pentyl group, a hexyl group, a heptyl group, an octyl group, an isopropyl group, an isobutyl group, an s-butyl group, a t-butyl group, an isopentyl group, a neopentyl group, a 1-methylbutyl group, an isohexyl group, a 2-ethylhexyl group, a 2-methylhexyl group and a cyclopentyl group. $R^1$ and $R^2$ are each preferably a hydrogen atom, a methyl group or an ethyl group from the viewpoints of effects and easiness of availability.

Such a hydrocarbon group may further have a substituent. When the alkyl group has a substituent, the substituted alkyl group is constituted by bonding between a substituent and an alkylene group. Here, a monovalent non-metal atomic group exclusive of hydrogen is used as the substituent. Preferred examples of the substituent include a halogen atom (for example, —F, —Br, —Cl and —I), an alkoxy group, an aryloxy group, an alkylthio group, an arylthio group, an N-alkylamino group, an N,N-dialkylamino group, an acyloxy group, an N-alkylcarbamoyloxy group, an N-arylcarbamoyloxy group, an acylamino group, a formyl group, an acyl group, a carboxyl group, an alkoxycarbonyl group, an aryloxycarbonyl group, a carbamoyl group, an N-alkylcarbamoyl group, an N,N-dialkylcarbamoyl group, an N-arylcarbamoyl group, an N-alkyl-N-arylcarbamoyl group, a sulfo group, a sulfonate group, a sulfamoyl group, an N-alkylsulfamoyl group, an N,N-dialkylsuifamoyl group, an N-arylsulfamoyl group, an N-alkyl-N-arylsulfamoyl group, a phosphono group, a phosphonate group, a dialkylphosphono group, a diarylphosphono group, a monoalkylphosphono group, an alkylphosphonate group, a monoarylphosphono group, an arylphosphonate group, a phosphonoxy group, a phosphonatoxy group, an aryl group and an alkenyl group.

On the other hand, as the alkylene group in the substituted alkyl group, an alkylene group obtained by eliminating any one of hydrogen atoms on the foregoing alkyl group having from 1 to 20 carbon atoms to convert the resulting alkyl group into a divalent organic residue can be exemplified. Preferred examples thereof include a linear alkylene group having from 1 to 12 carbon atoms, a branched alkylene group having from 3 to 12 carbon atoms and a cyclic alkylene group having from 5 to 10 carbon atoms. Specific examples of the preferred substituted alkyl group obtained by combining these substituent and alkylene group include a chloromethyl group, a bromomethyl group, a 2-chloroethyl group, a trifluoromethyl group, a methoxymethyl group, a methoxyethoxyethyl group, an allyloxymethyl group, a phenoxymethyl group, a methylthiomethyl group, a tolyithiomethyl group, an ethylaminoethyl group, a diethylaminopropyl group, a morpholinopropyl group, an acetyloxymethyl group, a benzoyloxymethyl group, an N-cyclohexylcarbamoyloxyethyl group, an N-phenylcarbamoyloxyethyl group, an acetylaminoethyl group, an N-methylbenzoylaminopropyl group, a 2-oxyethyl group, a 2-oxypropyl group, a carboxypropyl group, a methoxycarbonylethyl group, an allyloxycarbonylbutyl group, a chlorophenoxycarbonylmethyl group, a carbamoylmethyl group, an N-methylcarbamoylethyl group, an N,N-dipropyl-carbamoylmethyl group, an N-(methoxyphenyl)carbamoylethyl group, an N-methyl-N-(sulfophenyl)carbamoylmethyl group, a sulfobutyl group, a sulfonatobutyl group, a sulfamoylbutyl group, an N-ethylsulfamoylmethyl group, an N,N-dipropyl-sulfamoylpropyl group, an N-tolylsulfamoylpropyl group, an N-methyl-N-(phosphonophenyl)sulfamoyloctyl group, a phosphonobutyl group, a phosphonatohexyl group, a diethylphosphonobutyl group, a diphenylphosphonopropyl group, a methylphosphonobutyl group, a methylphosphonatobutyl group, a tolylphosphonohexyl group, a tolylphosphonatohexyl group, a phosphonoxypropyl group, a phosphonatoxybutyl group, a benzyl group, a phenethyl group, an a methylbenzyl group, a 1-methyl-1-phenylethyl group, a p-methylbenzyl group, a cinnamyl group, an allyl group, a 1-propenylmethyl group, a 2-butenyl group, a 2-methylallyl group, a 2-methyl-propenylmethyl group, a 2-propenyl group, a 2-butynyl group and a 3-butynyl group.

A and $L^1$ each represents a single bond or an organic connecting group. Here, when A and $L^1$ each represents an organic connecting group, A and $L^1$ each represents a polyvalent connecting group composed of a non-metal atom. Specific examples of the connecting group include those composed of from 1 to 60 carbon atoms, from 0 to 10 nitrogen atoms, from 0 to 50 oxygen atoms, from 1 to 100 hydrogen atoms and from 0 to 20 sulfur atoms. More specific examples of the connecting group include the following structural units or those constituted through a combination thereof.

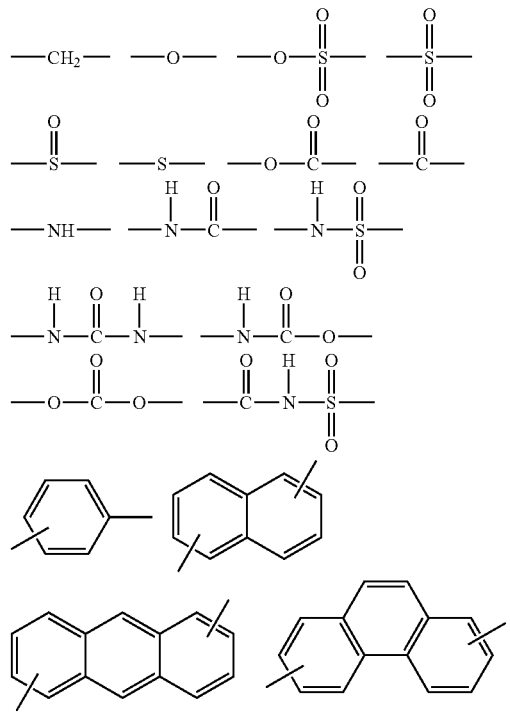

Y represents —NHCOR$^7$, CONH$_2$, —CON(R$^7$)$_2$, —COR$^7$, —OH, —CO$_2$M, —SO$_3$M, —PO$_3$M, —OPO$_3$M or —N(R$^7$)$_3$Z$^1$. Here, R$^7$ represents a linear, branched or cyclic alkyl group, an aryl group or an aralkyl group each having from 1 to 18 carbon atoms; M represents a hydrogen atom, an alkali metal, an alkaline earth metal or an onium; and Z$^1$ represents a halogen ion. When plural R$^7$s are present as in —CON(R$^7$)$_2$, R$^7$s may be taken together to form a ring; and the formed ring may be a hetero ring containing a hetero atom, for example, an oxygen atom, a sulfur atom and a nitrogen atom. R$^7$ may further have a substituent. Here, examples of the substituent which can be introduced include those exemplified above as the substituent which can be introduced when $R^1$ and $R^2$ each represents an alkyl group.

Preferred specific examples of R$^7$ include a methyl group, an ethyl group, a propyl group, a butyl group, a pentyl group, a hexyl group, a heptyl group, an octyl group, an isopropyl group, an isobutyl group, an s-butyl, a t-butyl group, an isopentyl group, a neopentyl group, a 1-methylbutyl group, an isohexyl group, a 2-ethylhexyl group, a 2-methylhexyl group and a cyclopentyl group. Also, examples of M include a hydrogen atom, an alkali metal (for example, lithium, sodium and potassium), an alkaline earth metal (for example, calcium and barium) and an onium (for example, ammonium, iodonium and sulfonium). Preferred specific examples of Y include —NHCOCH$_3$, —CONH$_2$, —COOH, —SO$_3^-$NMe$_4^+$ and a morpholino group.

Specific examples (Illustrative Compounds 1 to 38) of the hydrophilic polymer which can be favorably used in the invention will be given below, but it should not be construed that the invention is limited thereto.

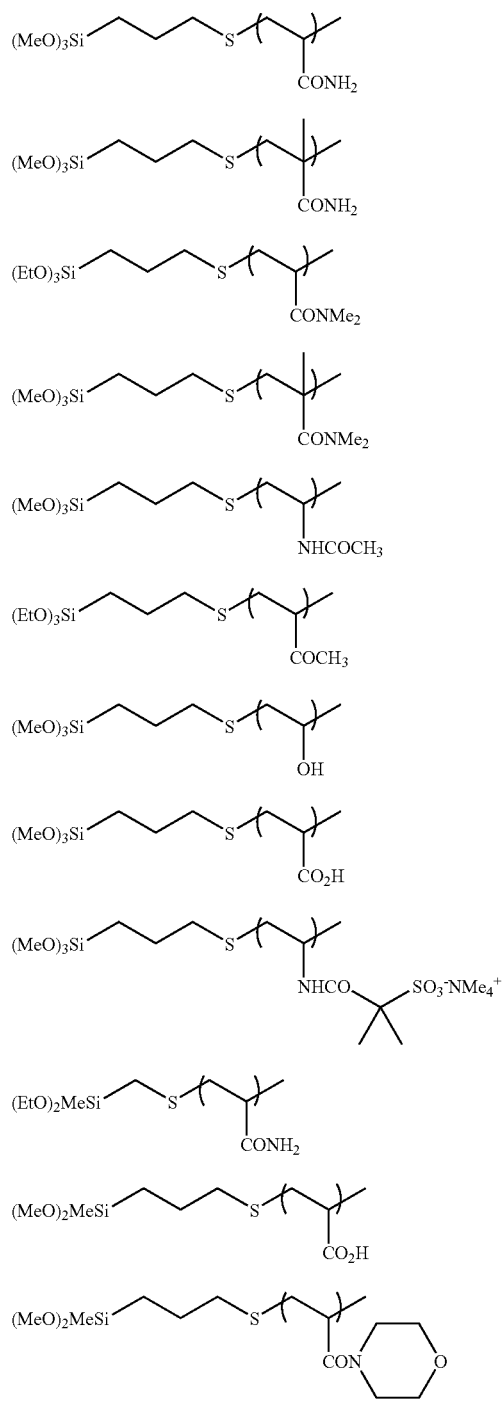

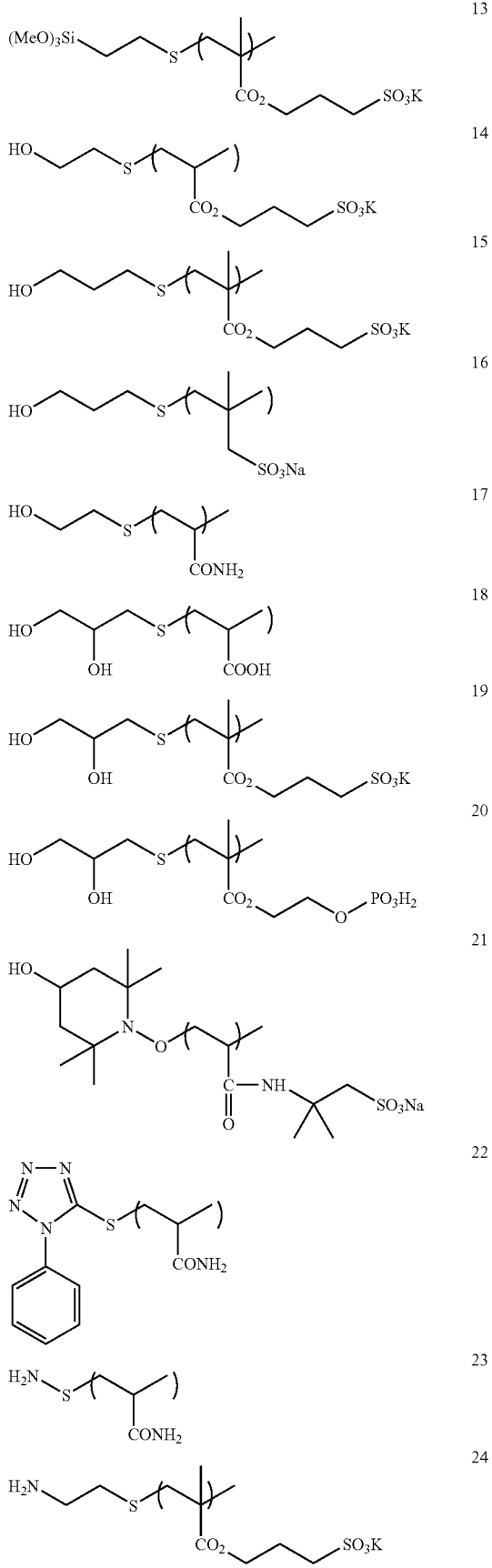

-continued

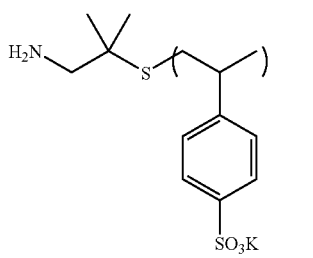

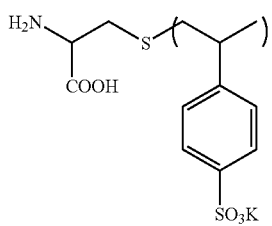

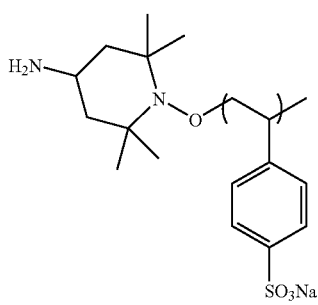

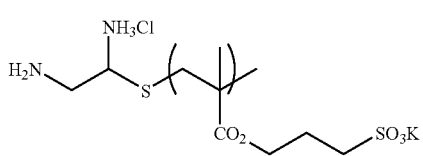

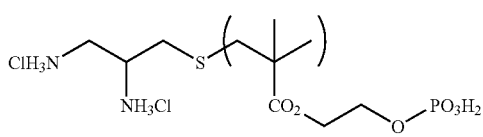

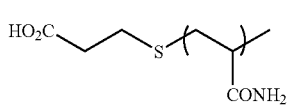

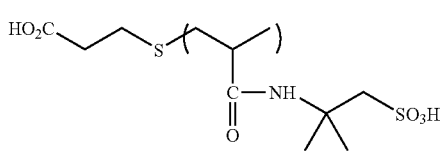

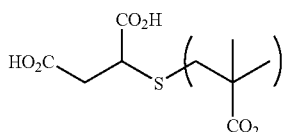

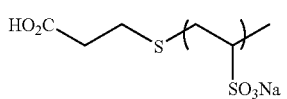

-continued

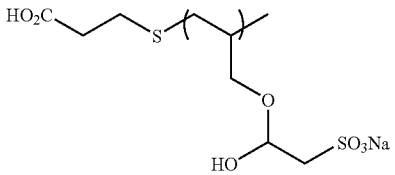

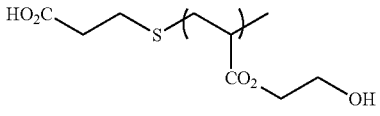

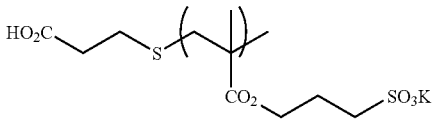

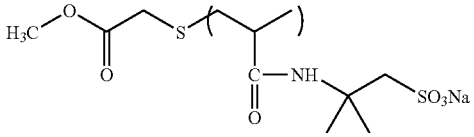

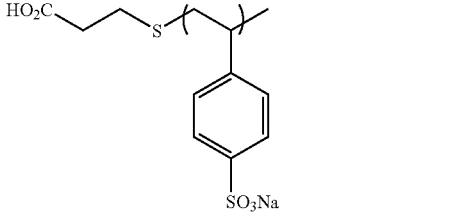

The above-exemplified hydrophilic polymers can be synthesized by radical polymerizing a radical polymerizable monomer represented by the following formula (i) by using a silane coupling agent having chain transfer ability in radical polymerization as represented by the following formula (ii). Since the silane coupling agent (ii) has chain transfer ability, a polymer in which a silane coupling group is introduced in an end of the polymer principal chain in the radical polymerization can be synthesized.

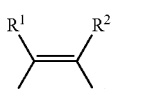

(i)

(ii)

In the foregoing formulae (i) and (ii), A, $R^1$ to $R^2$, $L^1$ and Y are synonymous with those in the foregoing formula (I). These compounds are commercially available or can be easily synthesized.

(Hydrophilic Polymer (II) Having Plural Reactive Groups)

As the hydrophilic polymer having plural reactive groups as represented by the foregoing formula (II), a hydrophilic graft polymer obtained by introducing a hydrophilic polymer side chain into a trunk polymer having a functional group capable of reacting with the metal alkoxide can be used.

In the foregoing formula (II), $R^3$, $R^4$, $R^5$ and $R^6$ each independently represents the same substituent as in $R^1$ and $R^2$ in the foregoing formula (I). $L^2$ and $L^3$ are synonymous with $L^1$ in the foregoing formula (I). B is represented by the foregoing formula (III); and $R^1$, $R^2$, $L^1$ and Y in the formula (III) are the same as those in the formulae (I) and (II). X is synonymous with X in the foregoing formula (I).

This hydrophilic graft polymer can be prepared by employing a method which is known as a general synthesis method of graft polymer. Concretely, the general synthesis method of graft polymer is described in *Graft Polymerization and Its Application*, written by Fumio IDE and published by Kobunshi Kankokai (1977) and *Shin Kobunshi Jikken-gaku* (New Polymer Experimentology) 2: *Synthesis and Reaction of Polymer*, edited by The Society of Polymer Science, Japan and published by Kyoritsu Shuppan Co., Ltd. (1995). These can be applied.

The synthesis method of graft polymer is basically classified into three methods of (1) a method of polymerizing a branched monomer from a trunk polymer, (2) a method of bonding a branched polymer to a trunk polymer and (3) a method of copolymerizing a branched polymer on a trunk polymer (macromer method). Thouqh the hydrophilic graft-polymerwhich is used in the invention can be prepared by using any of these three methods, the "macromer method" (3) is especially excellent from the viewpoints of manufacture aptitude and control of the film structure.

The synthesis of a graft polymer using a macromonomer is described in the foregoing *Shin Kobunshi Jikkengaku* (New Polymer Experimentology) 2: *Synthesis and Reaction of Polymer*, edited by The Society of Polymer Science, Japan and published by Kyoritsu Shuppan Co., Ltd. (1995). The synthesis of a graft polymer using a macromonomer is also described in detail in *Chemistry and InduLstry of Macromonomer*, written by Yu YAMASHITA, et al. and published by Industrial Publishing & Consulting, Inc. The graft polymer which is used in the invention can be first synthesized by copolymerizing a hydrophilic macromonomer synthesized by the foregoing method (corresponding to a precursor of the hydrophilic polymer side chain) with a monomer having a functional group capable of reacting with a crosslinking agent.

(Hydrophilic Macromonomer)

Among the hydrophilic macromonomers which are used in the invention, macromonomers derived from a carboxyl group-containing monomer (for example, acrylic acid and methacrylic acid); sulfonic acid based macromonomers derived from a monomer (for example, 2-acrylamido-2-methylpropane-sulfonic acid, vinylstyrenesulfonic acid and salts thereof); amide based macromonomers (for example, acrylamide and methacrylamide); amide based macromonomers derived from an N-vinylcarboxylic acid amide monomer (for example, N-vinylacetamide and N-vinylformamide); macromonomers derived from a hydroxyl group-containing monomer (for example, hydroxyethyl methacrylate, hydroxyethyl acrylate and glycerol monomethacrylate); and macromonomers derived from an alkoxy group or ethylene oxide group-containing monomer (for example, methoxyethyl acrylate, methoxypolyethylene glycol acrylate and polyethylene glycol acrylate) are especially useful. Also, monomers having a polyethylene glycol chain or a polypropylene glycol chain can be usefully used as the macromonomer of the invention. With respect to these macromonomers, the useful polymer has a weight average molecular weight (hereinafter simply referred to as "molecular weight") in the range of from 400 to 100,000, preferably in the range of from 1,000 to 50,000, and especially preferably in the range of from 1,500 to 20,000. When the molecular weight is 400 or more, effective hydrophilicity is obtained; and when the molecular weight is not more than 100,000, the polymerizability with a copolymerization monomer for forming the principal chain tends to become high. The both are preferable.

Examples of the reactive functional group of the monomer having a functional group which is copolymerizable with the hydrophilic macromonomer and is able to react with the crosslinking agent (hereinafter properly referred to as "reactive functional group") include a carboxyl group or a salt thereof, an amino group, a hydroxyl group, a phenolic hydroxyl group, an epoxy group (for example, glycidyl), a methyl group, a (block) isocyanate group and a silane coupling agent. Examples of general monomers include monomers described in *Crosslinking Agent Handbook*, written by Shinzo YAMASHITA and Tosuke KANEKO and published by Taiseisha Ltd. (1981); *Shigaisen Koka Shisutemu* (Ultraviolet Ray Curing Systems), written by Kiyoshi KATO and published by Sogo Gijutsu Center (1989); *UV or EB Curing Handbook (Raw Material Volume)*, written by Kiyoshi KATO and published by Kobunshi Kankokai (1985); and *Shin Kankosel Jushi No Jissal Gijutsu* (New Actual Technology of Photosensitive Resin), written by Kiyoshi AKNAMATSU and published by CMC Publishing Co., Ltd. (pages 102 to 145, (1987)). Specific examples thereof include (meth) acrylic acid or alkali or amine salts thereof, itaconic acid or alkali or amine salts thereof, 2-hydroxyethyl (meth)acrylate, hydroxypropyl (meth)acrylate, a phenolic hydroxyl group-containing monomer represented by the following formula (1), glycidyl methacrylate, allyl glycidyl ether, N-methylol methacrylamide, 2-methacryloyloxyethyl isocyanate, a block isocyanate monomer (for example, a block isocyanate group-containing monomer represented by the following formula (2)), a vinyl alkoxysilane and a γ-methacryloxypropyl trialkoxysilane.

Phenolic Hydroxyl Group-Containing Monomer (1)

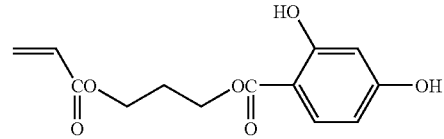

Block Isocyanate Group-Containing Monomer (2)

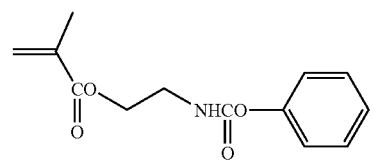

As these graft polymers, those having a weight average molecular weight of not more than 1,000,000 are preferably used. The molecular weight is more preferably in the range of from 1,000 to 1,000,000, and further preferably in the range of from 20,000 to 100,000. When the molecular weight is not more than 1,000,000, in preparing a coating solution for forming a hydrophilic film, the solubility in a solvent does not become worse, and there is no problem in handling such that the viscosity of the coating solution is low and that a uniform film is easily formed. Therefore, such is preferable.

The foregoing hydrophilic polymer has a hydrophilic functional group capable of revealing hydrophilicity as represented by Y in the formula. The higher the density of this functional group, the higher the surface hydrophilicity is, and therefore, such is favorable. The density of the hydrophilic functional group can be expressed by the molar number of the functional group per gram of the hydrophilic polymer and is preferably from 1 to 30 meq/g, more preferably from 2 to 20 meq/g, and most preferably from 3 to 15 meq/g.

The copolymerization ratio of the hydrophilic polymer (II) can be arbitrarily set up such that the amount of the hydrophilic functional group Y falls within the foregoing range. With respect to a molar ratio (m) of the monomer containing B and a molar ratio (n) of the monomer containing X, the range of m/n=30/70 to 99/1 is preferable, the range of m/n=40/60 to 98/2 is more preferable, and the range of m/n=50/50 to 97/3 is the most preferable. When m is a ratio of m/n=30/70 or more, the hydrophilicity is not insufficient. On the other hand, when n is a ratio of m/n=99/1 or more, the amount of the reactive group is sufficient, sufficient curing is obtained, and the film strength is sufficient.

The foregoing hydrophilic polymer forms a crosslinked film in a state that it is mixed with a hydrolysis and polycondensation product of the metal alkoxide. The hydrophilic polymer which is an organic component contributes to the film strength and film softness. In particular, when the viscosity of the hydrophilic polymer falls within the range of from 0.1 to 100 cPs (measured in a 5% aqueous solution at 25° C.), preferably from 0.5 to 70 cPs, and more preferably from 1 to 50 cPs, good film physical properties are imparted.

[Metal Alkoxide]

The metal alkoxide which is used in the invention is a hydrolyzable, polymerizable compound having a functional group which is polycondensable upon hydrolysis in a structure thereof and working a function as a crosslinking agent, and when metal alkoxides are polycondensed each other, a firm crosslinked film having a crosslinking structure is formed. Furthermore, the metal alkoxide is also chemically bonded to the foregoing hydrophilic polymer. The metal alkoxide is preferably an alkoxide of a metal selected among Si, Ti, Zr and Al. Such a metal alkoxide can be represented by the following formula (IV-1) or (IV-2). In these formulae, $R^8$ represents a hydrogen atom, an alkyl group or an aryl group; $R^9$ represents an alkyl group or an aryl group; Z represents Si, Ti or Zr; and m represents an integer of from 0 to 2. When $R^8$ and $R^9$ each represents an alkyl group, the carbon atom number is preferably from 1 to 4. The alkyl group and the aryl group may each have a substituent, and examples of the substituent which can be introduced include a halogen atom, an amino group and a mercapto group. This compound is a low-molecular weight compound and preferably has a molecular weight of not more than 2,000.

$$(R^8)_m\text{-}Z\text{-}(OR^9)_{4-m} \quad \text{(IV-1)}$$

$$Al\text{—}(OR^9)_3 \quad \text{(IV-2)}$$

Specific examples of the hydrolyzable compounds represented by the formulae (IV-1) and (IV-2) will be given below, but it should not be construed that the invention is limited thereto. In the case where Z represents Si, namely silicon is contained in the hydrolyzable compound, examples thereof include trimethoxysilane, tetramethoxysilane, tetra-ethoxysilane, tetrapropoxysilane, methyltrimethoxysilane, dimethyldimethoxysilane, γ-chloropropyltriethoxysilane, γ-mercaptopropyltrimethoxysilane, γ-aminopropylethoxysilane, phenyltrimethoxysilane and diphenyldimethoxysilane. Of these, trimethoxysilane, tetramethoxysilane, tetraethoxy-silane, methyltrimethoxysilane, dimethyldimethoxysilane and phenyltrimethoxysilane are especially preferable.

In the case where Z represents Ti, namely titanium is contained in the hydrolyzable compound, examples thereof include trimethoxy titanate, tetramethoxy titanate, triethoxy titanate, tetraethoxy titanate, tetrapropoxy titanate, chlorotrimethoxy titanate, chlorotriethoxy titanate, ethyltrimethoxytitanate, methyltriethoxy titanate, ethyltriethoxy titanate, diethyldiethoxy titanate, phenyl-trimethoxy titanate and phenyltriethoxy titanate. In the case where Z represents Zr, namely zirconium is contained in the hydrolyzable compound, examples thereof include zirconates corresponding to the above-exemplified titanium-containing compounds.

Also, in the case where the central metal is Al, namely aluminum is contained in the hydrolyzable compound, examples thereof include trimethoxy aluminate, triethoxy aluminate, tripropoxy aluminate and triisopropoxy aluminate.

[Catalyst]

As the catalyst, an acidic or basic compound can be used as it is or in a state that it is dissolved in water or a solvent such as alcohols. Besides the foregoing catalysts, a metal complex catalyst can also be used.

Though the kinds of the acidic catalyst and basic catalyst are not particularly limited, the following can be used.

Examples of the acidic catalyst include hydrogen halides (for example, hydrochloric acid), nitric acid, sulfuric acid, sulfurous acid, hydrogen sulfide, perchioric acid, hydrogen peroxide, carboxylic acids (for example, carbonic acid, formic acid and acetic acid) and benzenesulfonic acid.

Examples of the basic catalyst include ammoniacal bases (for example, ammonia water) and amines (for example, ethylamine and aniline).

When the foregoing catalyst is used as an aqueous solution thereof, its concentration is preferably not more than 1 N from the standpoint of the matter that a fault that when the concentration increases, a precipitate is generated in the coating solution does not occur.

The catalyst which is used in the invention is especially preferably a metal complex catalyst.

In the invention, the metal complex catalyst which can be used for the formation of a hydrophilic layer is able to accelerate hydrolysis and polycondensation of a metal alkoxide compound to generate a linkage with the hydrophilic polymer. The metal complex catalyst is especially preferably a metal complex constituted of a metal element selected among those belonging to the groups 2A, 3B, 4A and 5A of the periodic table and an oxo or hydroxyloxygen-containing compound selected among β-diketones, keto esters, hydroxycarboxylic acids or esters thereof, amino alcohols and etholic active hydrogen compounds.

Of the constitutional metal elements, elements of the group 2A (for example, Mg, Ca, St and Ba), elements of the group 3B (for example, Al and Ga), elements of the group 4A (for example, Ti and Zr) and elements of the group 5A (for example, V, Nb and Ta) are preferable, and each of them forms a complex having an excellent catalytic effect. Above all, complexes obtained from Zr, Al or Ti are excellent and preferable.

In the invention, examples of the oxo or hydroxyl oxygen-containing compound which constitutes a ligand of the foregoing metal complex include β-diketones (for example, acetylacetone, acetylacetone (2,4-pentanedione) and 2,4-heptanedione), keto esters (for example, methyl acetoacetate, ethyl acetoacetate and butyl acetoacetate), hydroxycarboxylic acids and esters thereof (for example, lactic acid, methyl lactate, salicylic acid, ethyl salicylate, phenyl salicylate, malic acid, tartaric acid and methyl tartarate), keto alcohols (for example, 4-hydroxy-4-meth-yl-2-pentanone, 4-hydroxy-2-pentanone, 4-hydroxy-4-meth-yl-2-pentanone and 4-hydroxy-2-heptanone), amino alcohols (for example, monoethanomamine, N,N-dimethylethanolamine, N-methyl-monoethanolamine, diethanolamine and triethanolamine), enolic active hydrogen compounds (for example, methylolmelamine, methylolurea, methylolacrylamide and diethyl malonate) and compounds having a substituent on the methyl group, methylene group or carbonyl carbon of acetylacetone (2,4-pentanedione).

The ligand is preferably an acetylacetone derivative. In the invention, the acetylacetone derivative refers to a compound having a substituent on the methyl group, methylene group or carbonyl carbon of acetylacetone. Examples of the substituent which is substituted on the methyl group of acetylacetone include a linear or branched alkyl group, a linear or branched acyl group, a linear or branched hydroxyalkyl group, a linear or branched carboxyalkyl group, a linear or branched alkoxy group and a linear or branched alkoxyalkyl group each having from 1 to 3 carbon atoms; examples of the substituent which is substituted on the methylene group of acetylacetone include a linear or branched carboxyalkyl group and a linear or branched hydroxyalkyl group each having from 1 to 3 carbon atoms as well as a carboxyl group; and examples of the substituent which is substituted on the carbonyl carbon of acetylacetone include an alkyl group having from 1 to 3 carbon atoms, and in this case, a hydrogen atom is added to the carbonyl oxygen to form a hydroxyl group.

Preferred specific examples of the acetylacetone derivative include acetylacetone, ethylcarbonylacetone, n-propylcarbonylacetone, i-propylcarbonylacetone, diacetylacetone, 1-acetyl-1-propionyl-acetylacetone, hydroxyethylcarbonylacetone, hydroxypropylcarbonylacetone, acetoacetic acid, acetopropionic acid, diacetoacetic acid, 3,3-diacetopropionic acid, 4,4-diacetobutyric acid, carboxy-ethylcarbonylacetone, carboxypropylcarbonylacetone and diacetone alcohol. Of these, acetylacetone and diacetyl-acetone are especially preferable. The complex of the foregoing acetylacetone derivative with the foregoing metal element is a mononuclear complex in which from 1 to 4 acetylacetone derivative molecules are coordinated per metal element. When the coordination number of the metal element is greater than the total coordination number of the acetylacetone derivative, ligands commonly used in usual complexes such as a water molecule, a halogen ion, a nitro group and an ammonio group may be coordinated on the metal element.

Preferred examples of the metal complexe include a tris (acetylacetonato)aluminum complex salt, a di-(acetylacetonato)aluminum aquocomplex, a mono-(acetylacetonato)aluminum chlorocomplex salt, a di-(diacetylacetonato) aluminum complex salt, ethylacetoacetate aluminum diisopropylate, aluminum tris(ethylacetoacetate), cyclic aluminum oxide isopropylate, a tris(acetyl-acetonato) barium complex salt, a di(acetylacetonato) titanium complex salt, a tris(acetylacetonato)titanium complex salt, a di-1-propoxy bis(acetylacetonato)titanium complex salt, zirconium tris (ethylacetoacetate) and a zirconium tris(benzoic acid) complex salt. These metal complexes exhibit excellent stability in an aqueous coating solution and are excellent in an effect for accelerating the gelation in a sol-gel reaction at the heat drying. Above all, ethylacetoacetate aluminum diisopropylate, aluminum tris(ethylacetoacetate), a di(acetylacetonato) titanium complex salt and zirconium tris(ethylacetoacetate) are especially preferable.

In this specification, the description of a counter salt of the foregoing metal complex is omitted. The kind of the counter salt is arbitrary so far as it is a water-soluble salt which keeps the electric charge as a complex compound neutral. Salts which can be stoichiometrically kept neutral, for example, nitrates, haloqenic acid salts, sulfates and phosphates, are useful. The behavior of a silica sol-gel reaction of the metal complex is described in detail in *J. Sol-Gel. Sci. and Tec.,* 16, 209 (1999). As its reaction mechanism, the following scheme may be presumed. That is, it is thought that the metal complex takes a coordination structure and is stable in a coating solution and in a dehydration condensation reaction starting with a heating and drying step after coating, accelerates crosslinking according to a mechanism similar to an acid catalyst. In any event, the use of this metal complex made it possible to improve the stability with time of the coating solution and the surface quality of the film and to attain high hydrophilicity and high durability.

In addition to the foregoing metal complex catalyst, a catalyst which is able to accelerate hydrolysis and polycondensation of a metal alkoxide compound to generate a linkage with the hydrophilic polymer may be used jointly. Examples of such a catalyst include compounds exhibiting acidity, for example, hydrogen halides (for example, hydrochloric acid), nitric acid, sulfuric acid, sulfurous acid, hydrogen sulfide, perchloric acid, hydrogen peroxide, carboxylic acids (for example, carbonic acid, formic acid and acetic acid) and substituted carboxylic acids in which in a structural formula represented by RCOOH, R is substituted with other element or a substituent and sulfonic acids (for example, benzenesulfonic acid); basic compounds, for example, ammoniacal bases (for example, ammonia water) and amines (for example, ethylamine and aniline).

The foregoing metal complex catalyst is easily available as a commercial product and is also obtainable by a known synthesis method, for example, a reaction between each metal chloride and an alcohol.

In view of the matters that the crosslinking reaction sufficiently proceeds and that the strength of the coating film is good, a content ratio of the catalyst to the metal alkoxide in the hydrophilic composition is preferably from 50/50 wt % to 20/80 wt %, and more preferably from 45/55 wt % to 30/70 wt %.

(Antimicrobial Agent)

In order to impart antimicrobial properties, anti-fungal properties and anti-algal properties to the hydrophilic member of the invention, an antimicrobial agent can be contained in the hydrophilic coating solution composition. In the formation of a hydrophilic layer, it is preferable to contain a hydrophilic, water-soluble antimicrobial agent. By containing the hydrophilic, water-soluble antimicrobial agent, a surface-hydrophilic member which is excellent in antimicrobial properties, anti-fungal properties and anti-algal properties is obtainable without impairing the surface hydrophilicity.

It is preferable that a compound which does not reduce the hydrophilicity of the hydrophilic member is added as the antimicrobial agent. Examples of such an antimicrobial agent include inorganic antimicrobial agents and water-soluble organic antimicrobial agents. As the antimicrobial agent, ones exhibiting an antimicrobial effect against fungi existing in the surroundings, for example, bacteria represented by *Staphylococcus aureus* and *Escherichia coli* and *Eumycetes* such as fungi and yeasts are useful.

Examples of the organic antimicrobial agent include phenol ether derivatives, imidazole derivatives, sulfone derivatives, N-haloalkylthio compounds, anilide derivatives, pyrrole derivatives, quaternary ammonium salts, pyridine based compounds, triazine based compounds, benzisothiazoline based compounds and isothiazoline based compounds.

Specific examples thereof 1,2-benzisothiazolin-3-one, N-fluorodichloromethylthiophthalimide, 2,3,5,6-tetra-chloroisophthalonitrile, N-trichloromethylthio-4-cyclo-hexene-1, 2-dicarboxylmide, copper 8-quinolinate, bis-(tributyltin)

oxide, 2-(4-thiazolyl)benzimidazole (hereinafter referred to as "TBZ"), methyl 2-benzimidazole carbamate (hereinafter referred to as "BCM"), 10,10'-oxybisphenoxy arsine (hereinafter referred to as "OBPA"), 2,3,5,6-tetrachloro-4-(methylsulfone)pyridine, bis(2-pyridylthio-1-oxide)zinc (hereinafter referred to as "ZPT"), N,N-dimethyl-N'-(fluorodichloromethyl-thio)-N'-phenylsulfamide (dichlorfluanid), poly(hexa-methylenebiguanid) hydrochloride, dithiol-2,2'-bis(benz-methylamide), 2-methyl-4,5-trimethylene-4-isothia-zolin-3-one, 2-bormo-2-nitro-1,3-propanediol, hexa-hydro-1,3-tris(2-hydroxyethyl)-s-triazine, p-chloro-m-xy-lenol and 1,2-benzisothiazolin-3-one. However, it should not be construed that the invention is limited thereto.

Such an organic antimicrobial agent can be properly chosen and used while taking into consideration hydrophilicity, water resistance, sublimation properties, safety, etc. Of the organic antimicrobial agents, 2-bromo-2-nitro-1,3-propanediol, TBZ, BCM, OBPA and ZPT are preferable in view of hydrophilicity, ant-bacterial effect and cost.

As the inorganic antimicrobial agent, mercury, silver, copper, zinc, iron, lead and bismuth can be exemplified in the order of a high sterilization effect. Examples thereof include antimicrobial agents obtained by supporting a metal (for example, silver, copper, zinc and nickel) or a metal ion thereof on a silicate based carrier, a phosphate based carrier, an oxide, glass, potassium titanate, an amino acid, etc. Specific examples thereof zeolite based antimicrobial agents, calcium silicate based antimicrobial agents, zirconium phosphate based antimicrobial agents, calcium phosphate based antimicrobial agents, zinc oxide based antimicrobial agents, soluble glass based antimicrobial agents, silica gel based antimicrobial agents, active carbon based antimicrobial agents, titanium oxide based antimicrobial agents, titania based antimicrobial agents, organometal based antimicrobial agents, ion exchanger ceramic based antimicrobial agents, stratiform phosphate-quaternary ammonium based antimicrobial agents and antimicrobial stainless steel. However, it should not be construed that the invention is limited thereto.

Examples of naturally occurring antimicrobial agents include chitosan which is a basic polysaccharide obtained by hydrolysis of chitin contained in crustaceans such as crabs and shrimps.

A trade name "HOLON KILLER BEADS CELLER" of Nikko Co., which is composed of an amino metal having a metal compounded on both sides of an amino acid, is preferable in the invention.

Such an antimicrobial agent is nonvolatile; is easy to mutually act on the polymer or the crosslinking agent component of the hydrophilic layer; and is stably molecularly dispersible or solid dispersible. Also, such an antimicrobial agent is easily exposed effectively on the surface of the hydrophilic layer and when wetted with water, does not elute and is able to hold its effect over a long period of time. Furthermore, it does not affect the human body. The antimicrobial agent can be stably dispersed in the hydrophilic layer or the coating solution and does not cause deterioration the hydrophilic layer or the coating solution.

Of the foregoing antimicrobial agents, silver based inorganic antimicrobial agents and water-soluble organic antimicrobial agents are the most preferable in view of the matter that the antimicrobial effect is large. A silver zeolite having silver supported on a zeolite as a silicate based carrier, an antimicrobial agent having silver supported on a silica gel, 2-bromo-2-nitro-1,3-propanediol, TPN, TBZ, BCM, OBPA and ZPT are especially preferable. Especially preferred examples of a commercially available silver zeolite based antimicrobial agent include ZEOPMIC (available from Shinagawa Fuel Co., Ltd.), SILWELL (available from Fuji Silysia Chemical Ltd.) and BACTENON (available from Japan Electronic Materials Corporation). Besides, NOVARON (available from Toagosei Co., Ltd.) having silver supported on an inorganic ion exchanger ceramic, ATOMY BALL (available from Catalysts & Chemicals Ind. Co., Ltd.) and SAN-AI BAC P (available from San-Ai Oil Co., Ltd.) which is a triazine based antimicrobial agent are also preferable.

The content of the antibacterial agent is generally from 0.001 to 10% by weight, preferably from 0.005 to 5% by weight, more preferably from 0.01 to 3% by weight, especially preferably from 0.02 to 1.5% by weight, and most preferably from 0.05 to 1% by weight relative to the whole solids content of the hydrophilic layer. When the content of the antibacterial agent is 0.001% by weight, an effective antimicrobial agent can be obtained. Also, when the content of the antibacterial agent is not more than 10% by weight or more, the hydrophilicity is not reduced; the properties with time do not become worse; and the antifouling properties and anti-fogging properties are not adversely affected.

[Inorganic Fine Particle]

The hydrophilic layer of the invention may contain an inorganic fine particle for the purposes of enhancing the hydrophilicity, preventing the generation of a crack of the film and enhancing the film strength. Examples of the inorganic fine particle which is favorably used include silica, alumina, magnesium oxide, titanium oxide, magnesium carbonate, calcium alginate and mixtures thereof.

The inorganic fine particle preferably has an average particle size of from 5 nm to 10 µm, and more preferably from 0.5 to 3 µm. When the particle size of the inorganic fine particle falls within the foregoing range, it is possible to form a hydrophilic member with high durability and excellent hydrophilicity in which the inorganic fine particle is stably dispersed in the hydrophilic layer and the film strength of the hydrophilic layer is sufficiently kept.

Of the foregoing inorganic fine particles, a colloidal silica dispersion is especially preferable and is easily available as a commercial product.

The content of the inorganic fine particle is preferably not more than 80% by weight, and more preferably not more than 50% by weight relative to the whole solids content of the hydrophilic layer.

[Other Components]

Various additives which can be used in the coating solution for forming a hydrophilic layer of the hydrophilic member of the invention as the need arises are hereunder described.

(1) Surfactant:

A surfactant may also be added in the coating solution for forming a hydrophilic layer of the hydrophilic member of the invention.

As the surfactant, there are exemplified surfactants described in JP-A-62-173463 and JP-A-62-183457. Examples thereof include anionic surfactants (for example, dialkyl-sulfosuccinic acid salts, alkylnaphthalenesulfonic acid salts and fatty acid salts); nonionic surfactants (for example, polyoxyethylene alkyl ethers, polyoxyethylene alkylaryl ethers, acetylene glycols and polyoxyethylene-polyoxypro-pylene block copolymers); and cationic surfactants (for example, alkylamine salts and quaternary ammonium salts). An organic fluoro compound may be used in place of the foregoing surfactant. It is preferable that the foregoing organic fluoro compound is hydrophobic. Examples of the foregoing organic fluoro compound include fluorocarbon surfactants, oily fluorocarbon compounds (for example, fluorocarbon oils) and solid fluorocarbon compound resins (for example, tetrafluoroethylene resins). Also, there are exemplified organic fluoro compounds as described in JP-B-57-9053 (columns 8 to 17) and JP-A-62-135826.

(2) Ultraviolet Ray Absorber:

In the invention, an ultraviolet ray absorber can be used from the viewpoints of an enhancement of the weather resistance and an enhancement of the durability of the hydrophilic member.

Examples of the ultraviolet ray absorber include benzotriazole based compounds described in JP-A-58-185677, JP-A-61-190537, JP-A-2-782, JP-A-5-197075 and JP-A-9-34057; benzophenone based compounds described in JP-A-46-2784, JP-A-5-194483 and U.S. Pat. No. 3,214,463; cinnamic acid based compounds described in JP-B-48-303492, JP-B-56-21141 and JP-A-10-88106; triazine based compounds described in JP-A-4-298503, JP-A-8-53427, JP-A-8-239368, JP-A-10-182621 and JPT-8-501291; compounds described in *Research Disclosure*, No. 24239; compounds capable of absorbing ultraviolet rays to emit fluorescence, as represented by stilbene based compounds and benzoxazole based compounds; and so-called fluorescent brighteners.

The addition amount of the ultraviolet ray absorber is properly chosen depending upon the purpose, and in general, it is preferably from 0.5 to 15% by weight as calculated as solids.

(3) Antioxidant:

For the purpose of enhancing the stability of the hydrophilic member of the invention, an antioxidant can be added in the coating solution for forming a hydrophilic layer. Examples of the antioxidant include those described in EP-A-223739, EP-A-309401, EP-A-309402, EP-A-310551, EP-A-310552, EP-A-459-416, DE-A-3435443, JP-A-54-262047, JP-A-63-113536, JP-A-63-163351, JP-A-2-262654, JP-A-2-71262, JP-A-3-121449, JP-A-5-61166, JP-A-5-119449 and U.S. Pat. Nos. 4,814,262 and 4,980,275.

The addition amount of the antioxidant is properly chosen depending upon the purpose and is preferably from 0.1 to 8% by weight as calculated as solids.

(4) Solvent:

At the formation of a hydrophilic layer of the hydrophilic member of the invention, for the purpose of securing the formability of a uniform coating film relative to the substrate, it is also effective to properly add an organic solvent in the coating solution for forming a hydrophilic layer.

Examples of the solvent include ketone based solvents (for example, acetone, methyl ethyl ketone and diethyl ketone); alcohol based solvents (for example, methanol, ethanol, 2-propanol, 1-propanol, 1-butanol and tert-butanol); chlorine based solvents (for example, chloroform and methylene chloride); aromatic solvents (for example, benzene and toluene); ester based solvents (for example, ethyl acetate, butyl acetate and isopropyl acetate); ether based solvents (for example, diethyl ether, tetrahydrofuran and dioxane); and glycol ether based solvents (for example, ethylene glycol monomethyl ether and ethylene glycol dimethyl ether).

In that case, it is effective to add the solvent in an amount within the range where problems in relation to VOC (volatile organic solvent) are not caused. Its amount is preferably in the range of from 0 to 50% by weight, and more preferably from 0 to 30% by weight relative to the whole of the coating solution at the formation of a hydrophilic member.

(5) High-molecular weight compound: For the purpose of adjusting film physical properties of the hydrophilic layer, various high-molecular weight compounds can be added in the coating solution for forming a hydrophilic layer of the hydrophilic member of the invention within the range where the hydrophilicity is not hindered. Examples of the high-molecular weight compound which can be used include acrylic polymers, polyvinyl alcohol resins, polyvinyl butyral resins, polyurethane resins, polyamide resins, polyester resins, epoxy resins, phenol resins, polycarbonate resins, polyvinyl formal resins, shellac, vinyl based resins, acrylic resins, rubber based resins, waxes and other natural resins. Such a high-molecular weight compound may be used in combination with two or more kinds thereof. Of these, vinyl based copolymers obtainable by copolymerization with an acrylic monomer are preferable. In addition, with respect to the copolymerization composition of a high-molecular weight binder, copolymers containing, as a structural unit, a "carboxyl group-containing monomer", an "alkyl methacrylate" or an "alkyl acrylate" are also preferably used.

Besides, for example, a leveling additive, a matting agent, a wax for adjusting film physical properties and a tackifier for improving adhesion to the substrate within the range where the hydrophilicity is not hindered can be contained as the need arises.

Specific examples of the tackifier include high-molecular weight adhesive polymers described on pages 5 to 6 of JP-A-2001-49200 (for example, copolymers made of an ester of (meth)acrylic acid and an alcohol having an alkyl group having from 1 to 20 carbon atoms, an ester of (meth)acrylic acid and an alicyclic alcohol having from 3 to 14 carbon atoms and an ester of (meth)acrylic acid and an aromatic alcohol having from 6 to 14 carbon atoms); and low-molecular weight tackiness-imparting resins having a polymerizable unsaturated bond.

[Preparation of Hydrophilic Composition]

A preparation method of the hydrophilic composition according to the invention is described. The hydrophilic composition contains a catalyst, a hydrophilic polymer and a metal alkoxide and may further contain a surfactant, a silica gel and the like as the need arises.

It is preferable that the catalyst is mixed immediately before coating on a base material. Concretely, it is preferable that the hydrophilic composition is coated (applied) immediately after mixing the catalyst or within a time of up to one hour after mixing. When the hydrophilic composition is coated (applied) after mixing the catalyst and allowing it to stand for a long period of time, the viscosity of the hydrophilic composition increases, whereby a defect such as coating unevenness is possibly generated.

With respect to other components, it is also preferable that the hydrophilic composition is mixed immediately before coating. In that case, however, the hydrophilic composition may be stored for a long period of time after mixing.

The preparation of the hydrophilic composition can be carried out by dissolving a hydrophilic polymer, a metal alkoxide and a catalyst in a solvent such as ethanol and then stirring the solution. The reaction temperature is preferably from room temperature to 80° C.; the reaction time, namely a time for continuing stirring, is preferably in the range of from 1 to 72 hours; and by advancing the hydrolysis and polycondensation of the both components by this stirring, an organic/inorganic composite sol liquid can be obtained.

The solvent which is used in preparing the foregoing hydrophilic composition containing a hydrophilic polymer, a metal alkoxide and a catalyst is not particularly limited so far as it is able to uniformly dissolve and disperse these components therein. Examples thereof include aqueous solvents such as methanol, ethanol and water.

As described previously, the preparation of the organic/inorganic composite sol liquid (hydrophilic composition) for forming a hydrophilic film from the hydrophilic composition of the invention utilizes a so-gel method. The sol-gel method is described in detail in Sumio SAKUHANA, *Sol-Gel-Ho No*

*Kagaku* (Science of Sol-Gel Process), published by Aqune Shofu Sha (1988); and Ken HIRASHIMA, *Saishin Sol-Gel-Ho Niyoru Kinosei Hakumaku Sakusei GijuLsu* (Functional Thin Film Formation Technology according to Newest Sol-Gel Method), published by General Technology Center (1992). In the invention, the methods as described in these documents can be applied to the preparation of the hydrophilic composition.

The hydrophilic member of the invention can be obtained by coating an adequate support with a solution containing such a hydrophilic composition of the invention and drying it. That is, the hydrophilic member of the invention has a hydrophilic film formed by coating with the hydrophilic composition of the invention and heating and drying it.

In the formation of the hydrophilic film, the drying temperature after coating with a solution containing the hydrophilic composition is preferably from 10° C. to 60° C., and more preferably from 25° C. to 50° C. When the drying temperature is lower than 10° C., a sufficient crosslinking reaction does not proceed, and the strength of the coating film is low. On the other hand, when it is higher than 60° C., a crack of the coating film is easily generated, whereby the antifogging properties and antifouling properties become partially insufficient. The drying time is preferably from 5 minutes to one hour, and more preferably from 10 minutes to 30 minutes.

When the drying time is too short, the strength of the coating film may possibly be reduced due to insufficient drying. When the drying time is excessively long, the base material may possibly be deteriorated. Also, as a heating measure, a known measure, for example, use of a dryer having a temperature-adjusting function is preferably employed.

[Base Material]

The base material which is used in the invention is not particularly limited. Any of glasses, plastics, metals, tiles, ceramics, woods, stones, cements, concretes, fibers, textiles, papers, leathers, combinations thereof and stacks thereof can be favorably utilized. Of these, glass substrates and plastic substrates are especially preferable as the base material.

As the glass substrate, any of glasses, for example, soda glass, flint glass and boro-silicate glass may be used. Also, float sheet glass, figured sheet glass, ground sheet glass, wire glass, crosswire glass, tempered glass, laminated glass, multilayered glass, vacuum glass, security glass and high-heat insulating Low-E multilayered glass can be used depending upon the purpose. Though the foregoing hydrophilic layer can be coated on a raw sheet glass as it is, for the purpose of enhancing the adhesion of the hydrophilic layer, one surface or both surfaces of the sheet glass can be subjected to a surface hydrophilization treatment such as an oxidation method and a roughing method as the need arises. Examples of the foregoing oxidation method include a corona discharge treatment, a glow discharge treatment, a chromic acid treatment (wet type), a flame treatment, a hot blast treatment and an ozone or ultraviolet ray irradiation treatment. As the roughing method, mechanical roughing by sand blast, brush polishing, etc. can be applied.

The plastic substrate which is used in the invention is not particularly limited, and examples thereof include films or sheets made of a polyester, polyethylene, polypropylene, cellophane, triacetyl cellulose, diacetyl cellulose, acetyl cellulose butyrate, polyvinyl chloride, polyvinylidene chloride, polyvinyl alcohol, ethylene vinyl alcohol, polystyrene, a polycarbonate, polymethylpentene, polysulfone, polyether ketone, an acrylic resin, a nylon, a fluorocarbon resin, a polyimide, polyether imide, polyether sulfone or the like. Of these, polyester films of polyethylene terephthalate, polyethylene naphthalate, etc. are preferable. From the optical standpoint, in many cases, plastic substrates with excellent transparency are preferable. Translucent or printed plastic substrates are used depending upon the application. The thickness of the plastic substrate varies with a material to be stacked. For example, in a portion where a number of curved surfaces are present, a thin plastic substrate is favorable, and one having a thickness of from about 6 to 50 μm is useful. When the plastic substrate is used for a flat surface or is required to have strength, one having a thickness of from 50 to 400 μm is useful.

For the purpose of enhancing the adhesion between the base material and the undercoat layer, one surface or both surfaces of the base material can be subjected to a surface hydrophilization treatment such as an oxidation method and a roughing method, if desired. Examples of the foregoing oxidation method include a corona discharge treatment, a glow discharge treatment, a chromic acid treatment (wet type), a flame treatment, a hot blast treatment and an ozone or ultraviolet ray irradiation treatment. As the roughing method, mechanical roughing by sand blast, brush polishing, etc. can be applied.

Furthermore, one or more undercoat layers can be provided. As a raw material of the undercoat layer, a hydrophilic resin or a water-dispersible latex can be used.

Examples of the hydrophilic resin include polyvinyl alcohol (PVC), cellulose based resins (for example, methyl cellulose (MC), hydroxyethyl cellulose (HEC) and carboxymethyl cellulose (CMC)), chitins, chitosans, starch, ether linkage-containing resins (for example, polyethylene oxide (PEO), polyethylene glycol (PEG) and polyvinyl ether (PVE)) and carbamoyl group-containing resins (for example, polyacrylamide (PAAM) and polyvinylpyrrolidone (PVP)). Also, carboxyl group-containing polyacrylic acid salts, maleic acid resins, alginic acid salts and gelatins can be exemplified.

Of these, at least one kind selected among polyvinyl alcohol based resins, cellulose based resins, ether linkage-containing resins, carbamoyl group-containing resins, carboxyl group-containing resins and gelatins is preferable, with polyvinyl alcohol (PVA) based resins and gelatins being especially preferable.

Examples of the water-dispersible latex include acrylic latexes, polyester based latexes, NBR resins, polyurethane based latexes, polyvinyl acetate based latexes, SBR resins and polyamide based latexes. Of these, acrylic latexes are preferable.

Each of the foregoing hydrophilic resin and water-dispersible latex may be used singly or in combination of two or more kinds thereof. The hydrophilic resin and the water-dispersible latex may be used jointly.

Also, a crosslinking agent capable of crosslinking the foregoing hydrophilic resin or water-dispersible latex may be used.

As the crosslinking agent which can be applied in the invention, a known crosslinking agent capable of forming crosslinking by heat can be used. Examples of general thermal crosslinking agents include those as described in *Crosslinking Agent Handbook*, written by Shinzo YAMASHITA and Tosuke KANEKO and published by Taiseisha Ltd. (1981). The crosslinking agent which is used in the invention is not particularly limited so far as it has two or more functional groups and is effectively crosslinkable with the hydrophilic resin or water-dispersible latex. Specific examples of the thermal crosslinking agent include polycarboxylic acids (for example, polyacrylic acid); amine compounds (for example, polyethyleneimine); polyepoxy compounds (for example, ethylene or propylene glycol diglycidyl ether, tetraethylene glycol diglycidyl ether, nonaethylene glycol diglycidyl ether, polyethylene or polypropylene glycol glycidyl ether, neopentyl glycol diglycidyl ether, 1,6-hexanediol diglycidyl ether, trimethylolpropane triglycidyl ether and sorbitol polyglycidyl ether); polyaldehyde compounds (for example, glyoxal and terephthalaldehyde); polyisocyanate compounds (for example, tolylene diisocyanate, hexamethylene diisocyanate, diphenylmethane isocyanate, xylylene diisocyanate, polymethylene polyphenyl isocyanate, cyclohexyl diisocyanate, cyclohexane phenylene diisocyanate, naphthalene-1,5-diisocyanate, isopropylbenzene-2,4-diisocyanate and a polypropylene glycol/tolylene diiosyanate addition reactant); block polyisocyanate compounds; silane coupling agents (for example, tetraalkoxysilanes); metal crosslinking agents (for example, acetyl acetonates of aluminum, copper or iron(III)); and polymethylol compounds (for example, trimethylolmelamine and pentaerythritol). Of these thermal crosslinking agents, water-soluble crosslinking agents are preferable from the viewpoints of easiness of the preparation of a coating solution and prevention of a reduction of the hydrophilicity of the prepared hydrophilic layer.

The total amount of the foregoing hydrophilic resin and/or water-dispersible latex in the undercoat layer is preferably from 0.01 to 20 g/m$^2$ and more preferably from 0.1 to 10 g/m$^2$.

[Layer Configuration at the Use of Hydrophilic Member]

When the hydrophilic member of the invention is used while expecting an effect for revealing antifouling properties and/or anti-fogging properties, it can be used upon proper addition of another layer depending upon the purpose, form or use place. The layer configuration which is added as the need arises is hereunder described.

(1) Adhesive Layer:

When the hydrophilic member of the invention is stuck on another base material and used, an adhesive which is a pressure-sensitive adhesive is favorably used as an adhesive layer on the back surface of the base material. As the adhesive, adhesives which are generally used for an adhesive sheet, for example, rubber based adhesives, acrylic adhesives, silicone based adhesives, vinyl ether based adhesives and styrene based adhesives can be used.

When optical transparency is required, adhesives useful for an optical application are chosen. When coloration, semi-transparency or a pattern with a mat tone is required, it is possible to bring the effect by adding a dye or an organic or inorganic fine particle to the adhesive in addition to patterning on the base material.

When a tackifier is required, a resin, for example, tackiness-imparting resins (for example, rosin based resins, terpene based resins, petroleum resins, styrene based resins and hydrogenation products thereof) can be used singly or in admixture.

The adhesive strength of the adhesive which is used in the invention is of generally called strong adhesion and is 200 g/25 mm or more, preferably 300 g/25 mm or more, and more preferably 400 g/25 mm or more. The "adhesive strength" as referred to herein is a value as measured by a 180-degree peeling test according to JIS Z0237.

(2) Release Layer:

When the hydrophilic member of the invention has the foregoing adhesive layer, a release layer can be further added. In order to bring release properties, it is preferable that a release agent is contained in the release layer. As the release agent, in general, silicone based release agents composed of a polyorganosiloxane, fluorocarbon based compounds, long-chain alkyl-modified products of polyvinyl alcohol, long-chain alkyl-modified production of polyethyleneimine and the like can be used. Also, various release agents, for example, hot melt type release agents and monomer type release agents capable of curing a releasable monomer by means of radical polymerization, cationic polymerization, polycondensation reaction, etc. and besides, copolymer based resins, for example, acryl-silicone based copolymer resins, acryl-fluorocarbon based copolymer resins and urethane-silicone-fluorocarbon based copolymer resins, resin blends of a silicone based resin and an acrylic resin and resin blends of a fluorocarbon based resin and an acrylic resin are useful. Also, a hard coat release layer obtained by curing a curable composition containing any one of a fluorine atom and/or a silicon atom and an active energy ray-polymerizable group-containing compound may be formed.

(3) Other Layers:

A passivation layer may be provided on the hydrophilic layer. The passivation layer has a function for preventing injuring on the hydrophilic surface at the handling, shipment or storage or the like or a reduction of the hydrophilicity to be caused due to the adhesion of a staining substance. As the passivation layer, the hydrophilic polymer layer used in the foregoing release layer or undercoat layer can be used. The passivation layer is peeled away after sticking the hydrophilic member onto an adequate base material.

[Form of Structure]

The structure having the hydrophilic layer of the invention may be fed in a sheet-like form, a roll-like form or a ribbon-like form. For the purpose of sticking onto an adequate base material, the structure may be fed in a form in which it is previously cut.

[Surface Free Energy]

The degree of hydrophilicity of the hydrophilic layer surface is in general measured in terms of a droplet contact angle. However, with respect to a surface with very high hydrophilicity as in the invention, there is a possibility that the droplet contact angle is not more than 10 degrees, and even not more than 5 degrees. Thus, in mutually comparing the degree of hydrophilicity, there is a limit. On the other hand, examples of a method for evaluating the degree of hydrophilicity on a solid surface in detail include a measurement of surface free energy. There are proposed various methods. In the invention, however, the surface free energy was measured by employing the Zisman plot method as one example. Concretely, the Zisman plot method is a measurement method in which by utilizing the properties that in an aqueous solution of an inorganic electrolyte, for example, magnesium chloride, its surface tension becomes large with an increase of the concentration thereof, a contact angle is measured in air under a room temperature condition by using the aqueous solution; a surface tension of the aqueous solution is taken on the abscissa, whereas a value obtained by reducing the contact angle into cos θ is taken on the ordinate; points of the aqueous solution of various concentrations are plotted to obtain a linear relationship; and the surface tension at cos θ=1, namely at a contact angle =0° is defined as surface free energy of the solid. The surface tension of water is 72 mN/m, and it may be said that the larger the value of surface free energy, the higher the hydrophilicity is.

The hydrophilic layer in which the surface free energy as measured in such a method is in the range of from 70 mN/m to 95 mN/m, preferably from 72 mN/Nm to 93 mN/m, and more preferably from 75 mN/m to 90 mN/m is excellent in hydrophilicity and exhibits a satisfactory performance.

When the hydrophilic member having a hydrophilic film provided therein according to the invention is applied (used and stuck) for a window glass or the like, the transparency is important from the viewpoint of securing the visibility. The hydrophilic layer according to the hydrophilic member of the invention is excellent in transparency, and even when the film thickness is thick, it is possible to make it compatible with durability without hindering the degree of transparency. The thickness of the hydrophilic layer is preferably from 0.01 μm to 10 μm, and more preferably from 0.1 μm to 1 μm. What the thickness is 0.01 μm or more is preferable because sufficient hydrophilicity is obtained; and what the thickness is not more than 10 μm is also preferable because a defect such as drying unevenness is not generated.

The transparency is evaluated by measuring a light transmittance in a visible light region (from 400 nm to 800 nm) by a spectrophotometer. The light transmittance is preferably in the range of from 100% to 70%, more preferably from 95% to 75%, and most preferably from 95% to 80%. When the light transmittance falls within this range, the hydrophilic member having a hydrophilic film provided therein can be applied to various applications without disturbing the visibility.

The hydrophilic member of the invention can be obtained by coating an adequate base material with a coating solution composition for forming a hydrophilic layer and heating and drying to form a surface hydrophilic layer. The heating temperature and heating time for forming a hydrophilic layer are not particularly limited so far as the solvent in the sol liquid can be removed and a firm film can be formed. In view of manufacture aptitude and the like, the heating temperature is preferably not higher than 150° C., and the heating time is preferably within one hour.

The hydrophilic member of the invention can be prepared by a known coating method without particular limitations. Examples of the coating method which can be applied include a spray coating method, a dip coating method, a flow coating method, a spin coating method, a roll coating method, a film applicator method, a screen printing method, a bar coater method, painting with a brush and painting with a sponge.

In carrying out the invention, when coating using a spray is performed, the spray to be used is not particularly limited, and a known spray can be used. For example, an air brush or an air gun may be used, and an air-less gun type may also be used. Also, a pump type spray of a trigger type or a dispenser type is useful. An air sol spray of a gas-filled type may be used. A type which does not use a gas while taking into consideration the environment is preferable. In particular, from the viewpoint of easiness of handling, it is desirable to use a trigger type spray.

For example, when an anti-fogging effect is expected, a material to which the hydrophilic member of the invention can be applied is a transparent material. Examples thereof include a transparent glass substrate, a transparent plastic substrate, a lens, a prism and a mirror.

As the glass, any of glasses, for example, soda glass, flint glass and boro-silicate glass may be used. Also, float sheet glass, figured sheet glass, ground sheet glass, wire glass, crosswire glass, tempered glass, laminated glass, multilayered glass, vacuum glass, security glass and high-heat insulating Low-E multilayered glass can be used depending upon the purpose.

Examples of applications to which the member having an anti-fogging effect can be applied include mirrors (for example, a vehicle rearview mirror, a bathroom mirror, a washroom mirror, a dental mirror and a road mirror); lenses (for example, a spectacle lens, an optical lens, a camera lens, an endoscope lens, a lighting lens, a semiconductor lens and a copier lens); prisms; window glasses of a building or a watchtower; other building material lenses; window glasses of various vehicles, for example, an automobile, a railway vehicle, an aircraft, a boat, a submersible, a snow vehicle, a gondola of ropeway and a gondola of amusement park; windshields of various vehicles, for example, an automobile, a railway vehicle, an aircraft, a boat, a submersible, a snow vehicle, a snowmobile, a motorcycle, a gondola of ropeway and a gondola of amusement park; protective goggles, sporting goggles, shields for protective mask, shields for sporting mask, shields of helmet and glasses of display case of frozen foods; cover glasses of measuring instrument; and films to be stuck on the surfaces of the foregoing articles. The most preferable application is an automobile or building glass.

Also, when the surface hydrophilic member of the invention is expected to have an antifouling effect, for example, in addition to glasses and plastics, any of metals, ceramics, woods, stones, cements, concretes, fibers, textiles, papers, combinations thereof and stacks thereof can be favorably utilized as the base material.

Examples of applications to which the member having an antifouling effect can be applied include building materials, building exteriors such as outer walls and roofs, building interiors, window frames, window glasses, structural members, exteriors and paints of vehicles, for example, automobiles, railway vehicles, aircrafts, boats, bicycles and motorcycles, exteriors of machine apparatus and articles, dustproof covers and paints, traffic signs, various display devices, advertising columns, road noise-blocking walls, railway noise-blocking walls, bridges, exteriors and paints of guardrail, tunnel interiors and paints, insulators, solar battery covers, heat collecting covers of solar water heater, vinyl green houses, covers of vehicular lamp, residential facilities, toilet bowls, bathtubs, washing sinks, luminaires, luminaire covers, kitchen utensils, dishes, dish washers, dish driers, kitchen sinks, cooking microwave ovens, kitchen hoods, ventilation fans and films to be stuck onto surfaces of the foregoing articles.

The applications also include signboards, traffic signs, noise-proof walls, vinyl green houses, insulators, vehicle covers, tent materials, reflectors, shutters, screens, solar battery covers, heat collecting covers of solar water heater, etc., outdoor lamps, pavements, outdoor lightings, stones or tiles for artificial fall or artificial fountain, bridges, greenhouses, outer wall materials, wall-to-wall or glass-to-glass sealers, guardrails, verandas, vending machines, outdoor units of air conditioner, outdoor benches, various display apparatus, shutters, tollhouses, charge boxes, roof gutters, protective covers for vehicle lamp, dustproof covers and paints, paints of machine apparatus and articles, exteriors and paints of advertising column, structural members, residential facilities, toilet bowls, bathtubs, washing sinks, luminaires, kitchen utensils, dishes, dish driers, kitchen sinks, cooking microwave ovens, kitchen hoods, ventilation fans, window rails, window frames, tunnel interiors, tunnel lightings, window sashes, heat radiation fans for heat exchanger, pavements, mirrors for bathroom or washroom, vinyl green house ceilings, washstands, automobile bodies, films to be stuck onto the foregoing articles and stickers.

The surface hydrophilic member of the invention is also applicable to roof materials for snowy district, antennas, power transmission lines and the like. On that occasion, an excellent characteristic in snow accretion-preventing properties is obtained.

Also, when the surface hydrophilic member of the invention is expected to have quick-drying properties of water, etc., for example, in addition to glasses and plastics, any of metals, ceramics, woods, stones, cements, concretes, fibers, textiles, papers, combinations thereof and stacks thereof can be favorably utilized as the base material.

Examples of applications to which the member having quick-drying properties of water, etc. can be applied include building materials, building exteriors such as outer walls and roofs, building interiors, window frames, window glasses, structural members, exteriors and paints of vehicles, for example, automobiles, railway vehicles, aircrafts, boats, bicycles and motorcycles, exteriors of machine apparatus and articles, dustproof covers and paints, traffic signs, various display devices, advertising columns, road noise-blocking walls, railway noise-blocking walls, bridges, exteriors and paints of guardrail, tunnel interiors and paints, insulators, solar battery covers, heat collecting covers of solar water heater, vinyl green houses, covers of vehicular lamp, residential facilities, toilet bowls, bathtubs, washing sinks, luminaires, luminaire covers, kitchen utensils, dishes, dish washers, dish driers, kitchen sinks, cooking microwave ovens, kitchen hoods, ventilation fans and films to be stuck onto surfaces of the foregoing articles.

The applications also include signboards, traffic signs, noise-proof walls, vinyl green houses, insulators, vehicle covers, tent materials, reflectors, shutters, screens, solar battery covers, heat collecting covers of solar water heater, etc., outdoor lamps, pavements, outdoor lightings, stones or tiles for artificial fall or artificial fountain, bridges, greenhouses, outer wall materials, wall-to-wall or glass-to-glass sealers, guardrails, verandas, vending machines, outdoor units of air conditioner, outdoor benches, various display apparatus, shutters, tollhouses, charge boxes, roof gutters, protective covers for vehicle lamp, dustproof covers and paints, paints of machine apparatus and articles, exteriors and paints of advertising column, structural members, residential facilities, toilet bowls, bathtubs, washing sinks, luminaires, kitchen utensils, dishes, dish driers, kitchen sinks, cooking microwave ovens, kitchen hoods, ventilation fans, window rails, window frames, tunnel interiors, tunnel lightings, window sashes, heat radiation fans for heat exchanger, pavements, mirrors for bathroom or washroom, vinyl green house ceilings, washstands, automobile bodies, films to be stuck onto the foregoing articles and stickers. Also, in the case where the manufacturing process of a product to be used for such an application includes a drying step, the drying time can be shortened so that an effect for enhancing the productivity can also be expected.

EXAMPLES

The invention is hereunder described in detail with reference to the following Examples, but it should not be construed that the invention is limited thereto. All parts are a part by weight unless otherwise indicated.

Example 1

400 parts of distilled water and 70 parts of ethanol were added to a catalyst, a hydrophilic polymer, a metal alkoxide and other raw material as shown in Table 1, and the mixture was stirred at 25° C. for 30 minutes to obtain a hydrophilic composition.

Next, a glass sheet (150 mm in square) as shown in Table 1 was coated with the hydrophilic composition in a dry thickness of 1 μm by using a spin coater. The coated (applied) hydrophilic composition was further dried at 10° C. for 10 minutes to prepare a hydrophilic member, which was then evaluated in the following methods.

Evaluation Methods
[Surface Free Energy]

By using a contact angle meter, DropMaster 500 (manufactured by Kyowa Interface Science Co., Ltd.), surface free energy was determined from a contact angle against water and a contact angle against methylene iodide with respect to the surface of the hydrophilic coating film. A unit of the surface free energy value as shown in Table 1 is mN/m.

[Scratch Resistance]

By using a scratch tester, HEIDON (manufactured by Shinto Scientific Co., Ltd.), a load of from 5 g of 100 g was applied to a 0.1-mmϕ sapphire stylus under a condition at 100 m/min and a scratch stroke of 100 mm, and a load at which a scratch was visually observed was evaluated.

[Anti-Fogging Properties]

A water vapor at 40° C. was applied to the surface of the hydrophilic member, and a state of fogging on the surface of the hydrophilic member after keeping apart from the water vapor was visually judged according to the following criteria.

Ten samples were prepared and evaluated.

A: Fogging is not observed in all of the ten samples.

B: Fogging is observed partially or entirely in one or two of the ten samples.

C: Fogging is observed partially or entirely in three or more of the ten samples.

[Antifouling Properties]

A line having a length of about 5 cm was drawn with an oil based ink (black oil based marker, manufactured by Mitsubishi Pencil Co., Ltd.) on the surface of the hydrophilic member; distilled water was continuously splashed; and whether or not the ink ran down was evaluated according to the following criteria.

Ten samples were prepared and evaluated.

A: The ink completely disappears within one minute in all of the ten samples.

B: The ink partially remains within one minute in one to three of the ten samples.

C: The ink partially remains within one minute in four or more of the ten samples.

[Observation of Coating Defect]

Platinum was vapor deposited in a thickness of about 30 angstroms on the surface of the hydrophilic member, an area of 100 mm in square of which was then visually observed by using a differential interference microscope and evaluated according to the following criteria.

Ten samples were prepared and evaluated.

Excellent: A defect is not observed in all of the ten samples.

Good: A cracked portion is partially observed in one to two of the ten samples.

Poor: A cracked portion is partially observed in three or more of the ten samples.

[Rate of Drying of Water]

About 1 cc of pure water was dropped on the surface of the hydrophilic member; the hydrophilic member was allowed to stand under an environment at 25° C. and 50% RH; and a time until the droplet was dried was measured by visual observation at every 5 minutes.

Examples 2 to 17 and Comparative Examples 1 to 15

Hydrophilic members were prepared in the same manner as in Example 1, except for employing a catalyst, a hydrophilic polymer, a metal alkoxide, other raw material, a base material, a film thickness and a drying temperature as shown in Table 1.

The film thickness was adjusted by the revolution number of a spin coater and the dropping amount and concentration of the solution.

Example 18

The hydrophilic composition as used in Example 1 was charged in a trigger spray container (manufactured by Canyon Corporation), sprayed in a dry thickness of 1 μm on a glass sheet (150 mm in square) and then dried at 25° C. for 10 minutes to prepare a hydrophilic member. The hydrophilic member was evaluated in the same evaluation methods as in Example 1. The results obtained are shown in Table 2.

Comparative Example 16

A hydrophilic member was prepared and evaluated in the same manner as in Example 18, except for changing the drying temperature to 5° C. The results obtained are shown in Table 2.

TABLE 1

| | (a) Catalyst | | (b) Hydrophilic polymer | | (c) Metal alkoxide | | (d) Others | |
|---|---|---|---|---|---|---|---|---|
| Example 1 | Titanium acetyl acetate | 20 parts | Compound A | 25 parts | Tetramethoxysilane | 80 parts | | |
| Example 2 | Titanium acetyl acetate | 20 parts | Compound A | 25 parts | Tetramethoxysilane | 80 parts | | |
| Example 3 | Titanium acetyl acetate | 20 parts | Compound A | 25 parts | Tetramethoxysilane | 80 parts | | |
| Example 4 | Titanium acetyl acetate | 20 parts | Compound A | 25 parts | Tetramethoxysilane | 80 parts | | |
| Example 5 | Titanium acetyl acetate | 50 parts | Compound A | 25 parts | Tetramethoxysilane | 50 parts | | |
| Example 6 | Titanium acetyl acetate | 50 parts | Compound A | 25 parts | Al ethoxide | 50 parts | | |
| Example 7 | Titanium acetyl acetate | 50 parts | Compound A | 25 parts | Zr ethoxide | 50 parts | | |
| Example 8 | Titanium acetyl acetate | 50 parts | Compound A | 25 parts | Ti ethoxide | 50 parts | | |
| Example 9 | Titanium acetyl acetate | 50 parts | Compound B | 25 parts | Tetramethoxysilane | 50 parts | | |
| Example 10 | Titanium acetyl acetate | 50 parts | Compound B | 25 parts | Tetramethoxysilane | 50 parts | Silica sol A | 20 parts |
| Example 11 | Titanium acetyl acetate | 50 parts | Compound B | 25 parts | Tetramethoxysilane | 50 parts | Surfactant A | 2 parts |
| Example 12 | Titanium acetyl acetate | 50 parts | Compound B | 25 parts | Tetramethoxysilane | 50 parts | | |
| Example 13 | 1N hydrochloric aqueous solution | 50 parts | Compound A | 25 parts | Tetramethoxysilane | 50 parts | | |
| Example 14 | Titanium acetyl acetate | 50 parts | Compound A | 25 parts | Tetramethoxysilane | 50 parts | | |
| Example 15 | Titanium acetyl acetate | 50 parts | Compound A | 25 parts | Tetramethoxysilane | 50 parts | | |
| Example 16 | Titanium acetyl acetate | 50 parts | Compound A | 25 parts | Tetramethoxysilane | 50 parts | | |
| Example 17 | Titanium acetyl acetate | 50 parts | Compound A | 25 parts | Tetramethoxysilane | 50 parts | | |
| Comparative Example 1 | Titanium acetyl acetate | 20 parts | Compound A | 25 parts | Tetramethoxysilane | 80 parts | | |
| Comparative Example 2 | Titanium acetyl acetate | 20 parts | Compound A | 25 parts | Tetramethoxysilane | 80 parts | | |
| Comparative Example 3 | Titanium acetyl acetate | 20 parts | Compound B | 25 parts | Tetramethoxysilane | 80 parts | | |
| Comparative Example 4 | Titanium acetyl acetate | 20 parts | Compound B | 25 parts | Tetramethoxysilane | 80 parts | | |
| Comparative Example 5 | Titanium acetyl acetate | 20 parts | Compound B | 25 parts | Tetramethoxysilane | 80 parts | | |
| Comparative Example 6 | Titanium acetyl acetate | 20 parts | Compound B | 25 parts | Tetramethoxysilane | 80 parts | | |
| Comparative Example 7 | Titanium acetyl acetate | 20 parts | Compound B | 25 parts | Tetramethoxysilane | 80 parts | | |
| Comparative Example 8 | 1N hydrochloric aqueous solution | 20 parts | Compound B | 25 parts | Tetramethoxysilane | 80 parts | | |
| Comparative Example 9 | Titanium acetyl acetate | 20 parts | Compound A | 25 parts | Al ethoxide | 80 parts | | |
| Comparative Example 10 | Titanium acetyl acetate | 20 parts | Compound A | 25 parts | Zr ethoxide | 80 parts | | |
| Comparative Example 11 | Titanium acetyl acetate | 20 parts | Compound A | 25 parts | Ti ethoxide | 80 parts | | |
| Comparative Example 12 | Titanium acetyl acetate | 20 parts | Compound A | 25 parts | Ti ethoxide | 80 parts | Silica sol A | 20 parts |
| Comparative Example 13 | Titanium acetyl acetate | 20 parts | Compound A | 25 parts | Ti ethoxide | 80 parts | Surfactant A | 2 parts |
| Comparative Example 14 | Titanium acetyl acetate | 20 parts | Compound A | 25 parts | Tetramethoxysilane | 80 parts | | |
| Comparative Example 15 | Titanium acetyl acetate | 20 parts | Compound A | 25 parts | Tetramethoxysilane | 80 parts | | |

| | Heating temperature | Base material | Film thickness | Surface free energy | Scratch strength | Anti-fogging properties | Antifouling properties | Rate of drying of water | Observation of coating defect |
|---|---|---|---|---|---|---|---|---|---|
| Example 1 | 10° C. | Glass sheet | 1 μm | 82 | 100 g or more | A | A | 15 minutes | Excellent |
| Example 2 | 25° C. | Glass sheet | 1 μm | 80 | 100 g or more | A | A | 15 minutes | Excellent |
| Example 3 | 40° C. | Glass sheet | 1 μm | 81 | 100 g or more | A | A | 15 minutes | Excellent |
| Example 4 | 60° C. | Glass sheet | 1 μm | 82 | 100 g or more | A | A | 15 minutes | Excellent |
| Example 5 | 40° C. | Glass sheet | 1 μm | 83 | 100 g or more | A | A | 15 minutes | Excellent |
| Example 6 | 40° C. | Glass sheet | 1 μm | 80 | 100 g or more | A | A | 15 minutes | Excellent |
| Example 7 | 40° C. | Glass sheet | 1 μm | 78 | 100 g or more | A | A | 15 minutes | Excellent |
| Example 8 | 40° C. | Glass sheet | 1 μm | 82 | 100 g or more | A | A | 15 minutes | Excellent |
| Example 9 | 40° C. | Glass sheet | 1 μm | 81 | 100 g or more | A | A | 15 minutes | Excellent |
| Example 10 | 40° C. | Glass sheet | 1 μm | 80 | 100 g or more | A | A | 15 minutes | Excellent |
| Example 11 | 40° C. | Glass sheet | 1 μm | 82 | 100 g or more | A | A | 15 minutes | Excellent |
| Example 12 | 40° C. | PET film | 1 μm | 82 | 100 g or more | A | A | 15 minutes | Excellent |
| Example 13 | 40° C. | Glass sheet | 1 μm | 81 | 100 g or more | A | A | 15 minutes | Excellent |

TABLE 1-continued

| | | | | | | | | | | |
|---|---|---|---|---|---|---|---|---|---|---|
| Example 14 | 40° C. | Glass sheet | 0.1 μm | 81 | 100 g or more | A | A | 15 minutes | Excellent |
| Example 15 | 40° C. | Glass sheet | 10 μm | 80 | 100 g or more | A | A | 15 minutes | Excellent |
| Example 16 | 40° C. | Stainless steel plate | 1 μm | 82 | 100 g or more | A | A | 15 minutes | Excellent |
| Example 17 | 40° C. | Tile | 1 μm | 80 | 100 g or more | A | A | 15 minutes | Excellent |
| Comparative Example 1 | 5° C. | Glass sheet | 1 μm | 78 | 50 g | C | C | 60 minutes | Excellent |
| Comparative Example 2 | 80° C. | Glass sheet | 1 μm | 82 | 100 g or more | B | B | 30 minutes | Poor |
| Comparative Example 3 | 5° C. | Glass sheet | 1 μm | 80 | 30 g | C | C | 50 minutes | Excellent |
| Comparative Example 4 | 80° C. | Glass sheet | 1 μm | 83 | 100 g or more | B | B | 30 minutes | Poor |
| Comparative Example 5 | 80° C. | PET plate | 1 μm | 82 | 100 g or more | B | B | 40 minutes | Poor |
| Comparative Example 6 | 80° C. | Glass sheet | 0.1 μm | 81 | 100 g or more | B | B | 30 minutes | Good |
| Comparative Example 7 | 80° C. | Glass sheet | 10 μm | 82 | 73 g | C | C | 70 minutes | Poor |
| Comparative Example 8 | 80° C. | Glass sheet | 1 μm | 80 | 100 g or more | B | B | 30 minutes | Good |
| Comparative Example 9 | 80° C. | Glass sheet | 1 μm | 81 | 100 g or more | B | B | 30 minutes | Good |
| Comparative Example 10 | 80° C. | Glass sheet | 1 μm | 82 | 100 g or more | B | B | 30 minutes | Good |
| Comparative Example 11 | 80° C. | Glass sheet | 1 μm | 79 | 100 g or more | B | B | 30 minutes | Good |
| Comparative Example 12 | 80° C. | Glass sheet | 1 μm | 82 | 100 g or more | B | B | 30 minutes | Good |
| Comparative Example 13 | 80° C. | Glass sheet | 1 μm | 82 | 100 g or more | B | B | 30 minutes | Good |
| Comparative Example 14 | 80° C. | Stainless steel plate | 1 μm | 81 | 100 g or more | B | B | 30 minutes | Good |
| Comparative Example 15 | 80° C. | Tile | 1 μm | 82 | 100 g or more | B | B | 30 minutes | Good |

TABLE 2

| | Surface free energy | Scratch strength | Anti-fogging properties | Antifouling properties | Rate of drying water | Observation of coating defect |
|---|---|---|---|---|---|---|
| Example 18 | 83 | 100 g or more | A | A | 15 minutes | Excellent |
| Comparative Example 16 | 77 | 50 g | C | C | 55 minutes | Excellent |

In Table 1, Compounds A and B as the hydrophilic polymer are described below. Compound A has an Mw of 23,500; and Compound B has an Mw of 25,400 (all of which are those as measured by GPC (as reduced into standard polystyrene)).
Hydrophilic Polymer:

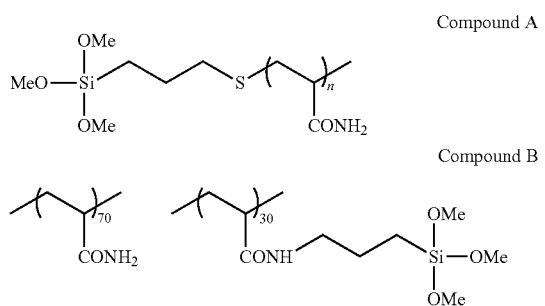

Also, in Table 1, the silica sol A as used is a methanol sol thereof having an average particle size of 20 nm; the surfactant A as used is sodium octadecanesulfonate; the glass sheet A as used is a float sheet glass (thickness: 2 mm); and the PET film as used is one having a thickness of 50 μm and a surface roughness Ra of 10 nm.

This application is based on Japanese Patent application JP 2007-36606 filed Feb. 16, 2007, and Japanese Patent application JP 2007-256734, filed Sep. 28, 2007, the entire contents of which are hereby incorporated by reference, the same as if fully set forth herein.

Although the invention has been described above in relation to preferred embodiments and modifications thereof, it will be understood by those skilled in the art that other variations and modifications can be effected in these preferred embodiments without departing from the scope and spirit of the invention.

What is claimed is:

1. A process for producing a hydrophilic member, comprising: coating a surface of a base material with a hydrophilic composition containing at least (a) a catalyst, (b) a hydrophilic polymer and (c) a metal alkoxide; and drying the composition, wherein a temperature for the drying is from 10° C. to 60° C.

2. The process for producing a hydrophilic member according to claim 1, wherein the metal alkoxide is an alkoxide of an element selected among Si, Ti, Zr and Al.

3. The process for producing a hydrophilic member according to claim 1, wherein a weight ratio of the catalyst to the metal alkoxide contained in the hydrophilic composition is from 50/50 to 20/80.

4. The process for producing a hydrophilic member according to claim 2, wherein a weight ratio of the catalyst to the metal alkoxide contained in the hydrophilic composition is from 50/50 to 20/80.

5. The process for producing a hydrophilic member according to claim 1, wherein the base material is a member selected from the group consisting of glass, a plastic, a metal and a tile.

6. The process for producing a hydrophilic member according to claim 2, wherein the base material is a member selected from the group consisting of glass, a plastic, a metal and a tile.

7. The process for producing a hydrophilic member according to claim 3, wherein the base material is a member selected from the group consisting of glass, a plastic, a metal and a tile.

8. The process for producing a hydrophilic member according to claim 4, wherein the base material is a member selected from the group consisting of glass, a plastic, a metal and a tile.

9. The process for producing a hydrophilic member according to claim 1, wherein a weight ratio of the catalyst to the metal alkoxide contained in the hydrophilic composition is from 45/55 to 30/70.

10. The process for producing a hydrophilic member according to claim 1, wherein a temperature for the drying is from 25° C. to 50° C.

11. The process for producing a hydrophilic member according to claim 1, wherein a time for the drying is from 5 minutes to one hour.

12. The process for producing a hydrophilic member according to claim 1, wherein a time for the drying is from 10 minutes to 30 minutes.

13. The process for producing a hydrophilic member according to claim 1, wherein the metal alkoxide is represented by the following formula (IV-1) or (1V-2):

$$(R^8)_m\text{—}Z\text{—}(OR^9)_{4-m} \qquad \text{(IV-1)}$$

$$Al\text{—}(OR^9)_3 \qquad \text{(IV-2)}$$

wherein $R^8$ represents a hydrogen atom, an alkyl group which may have a substituent or an aryl group which may have a substituent; $R^9$ represents an alkyl group which may have a substituent or an aryl group which may have a substituent; Z represents Si, Ti or Zr; and m represents an integer of from 0 to 2.

14. The process for producing a hydrophilic member according to claim 3, wherein the metal alkoxide is represented by the following formula (IV-1) or (IV-2):

$$(R^8)_m\text{—}Z\text{—}(OR^9)_{4-m} \qquad \text{(IV-1)}$$

$$Al\text{—}(OR^9)_3 \qquad \text{(IV-2)}$$

wherein $R^8$ represents a hydrogen atom, an alkyl group which may have a substituent or an aryl group which may have a substituent; $R^9$ represents an alkyl group which may have a substituent or an aryl group which may have a substituent; Z represents Si, Ti or Zr; and m represents an integer of from 0 to 2.

* * * * *